(12) United States Patent
Mahgerefteh et al.

(10) Patent No.: US 7,477,851 B2
(45) Date of Patent: Jan. 13, 2009

(54) POWER SOURCE FOR A DISPERSION COMPENSATION FIBER OPTIC SYSTEM

(75) Inventors: Daniel Mahgerefteh, Los Angeles, CA (US); Parviz Tayebati, Weston, MA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/272,100

(22) Filed: Nov. 8, 2005

(65) Prior Publication Data

US 2006/0233556 A1    Oct. 19, 2006

Related U.S. Application Data

(63) Continuation of application No. 10/289,944, filed on Nov. 6, 2002, now Pat. No. 6,963,685.

(60) Provisional application No. 60/395,161, filed on Jul. 9, 2002, provisional application No. 60/401,419, filed on Aug. 6, 2002.

(51) Int. Cl.
*H04B 10/04* (2006.01)
(52) U.S. Cl. ............................ 398/201; 398/193
(58) Field of Classification Search ......... 398/185–187, 398/193–196, 200–201
See application file for complete search history.

(56) References Cited

U.S. PATENT DOCUMENTS

| | | | |
|---|---|---|---|
| 3,324,295 A | 6/1967 | Harris | |
| 3,999,105 A | 12/1976 | Archey et al. | |
| 4,038,600 A | 7/1977 | Thomas et al. | |
| 4,561,119 A | 12/1985 | Epworth | |
| 4,805,235 A | 2/1989 | Henmi | |
| 4,841,519 A | 6/1989 | Nishio | |
| 5,293,545 A | 3/1994 | Huber | |
| 5,325,378 A | 6/1994 | Zorabedian | |
| 5,371,625 A | 12/1994 | Wedding et al. | |
| 5,412,474 A | 5/1995 | Reasenberg et al. | |
| 5,416,629 A | 5/1995 | Huber | |
| 5,465,264 A | 11/1995 | Buhler et al. | |
| 5,477,368 A | 12/1995 | Eskildsen et al. | |
| 5,550,667 A | 8/1996 | Krimmel et al. | |

(Continued)

FOREIGN PATENT DOCUMENTS

GB    2107147    4/1983

(Continued)

OTHER PUBLICATIONS

Chang-Hee Lee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

(Continued)

*Primary Examiner*—Leslie Pascal
(74) *Attorney, Agent, or Firm*—Workman Nydegger

(57) ABSTRACT

This invention generally relates to an optical filter for a fiber optic communication system. An optical filter may be used, following a directly modulated laser source, and converts a partially frequency modulated signal into a substantially amplitude modulated signal. The optical filter may compensate for the dispersion in the fiber optic transmission medium and may also lock the wavelength of the laser source.

11 Claims, 24 Drawing Sheets

U.S. PATENT DOCUMENTS

| | | | |
|---|---|---|---|
| 5,737,104 A | 4/1998 | Lee et al. | |
| 5,777,773 A * | 7/1998 | Epworth et al. | 398/185 |
| 5,805,235 A | 9/1998 | Bedard | |
| 5,856,980 A | 1/1999 | Doyle et al. | |
| 5,920,416 A | 7/1999 | Beylat et al. | |
| 5,953,139 A | 9/1999 | Nemecek et al. | |
| 5,974,209 A | 10/1999 | Cho et al. | |
| 6,081,361 A | 6/2000 | Adams et al. | |
| 6,096,496 A | 8/2000 | Frankel | |
| 6,104,851 A | 8/2000 | Mahgerefteh | |
| 6,115,403 A | 9/2000 | Brenner et al. | |
| 6,222,861 B1 | 4/2001 | Kuo et al. | |
| 6,271,959 B1 | 8/2001 | Kim et al. | |
| 6,298,186 B1 | 10/2001 | He | |
| 6,331,991 B1 | 12/2001 | Mahgerefteh | |
| 6,359,716 B1 | 3/2002 | Taylor | |
| 6,473,214 B1 | 10/2002 | Roberts et al. | |
| 6,506,342 B1 | 1/2003 | Frankel | |
| 6,563,623 B1 | 5/2003 | Penninckx et al. | |
| 6,577,013 B1 | 6/2003 | Glenn et al. | |
| 6,618,513 B2 | 9/2003 | Evankow, Jr. | |
| 6,654,564 B1 | 11/2003 | Colbourne et al. | |
| 6,665,351 B2 | 12/2003 | Hedberg et al. | |
| 6,748,133 B2 | 6/2004 | Liu et al. | |
| 6,778,307 B2 | 8/2004 | Clark | |
| 6,810,047 B2 | 10/2004 | Oh et al. | |
| 6,836,487 B1 | 12/2004 | Farmer et al. | |
| 6,847,758 B1 | 1/2005 | Watanabe | |
| 6,943,951 B2 | 9/2005 | Kikuchi et al. | |
| 6,947,206 B2 | 9/2005 | Tsadka et al. | |
| 6,963,685 B2 * | 11/2005 | Mahgerefteh et al. | 385/37 |
| 7,013,090 B2 | 3/2006 | Adachi et al. | |
| 7,054,538 B2 | 5/2006 | Mahgerefteh et al. | |
| 7,076,170 B2 | 7/2006 | Choa | |
| 7,123,846 B2 | 10/2006 | Tateyama et al. | |
| 7,164,865 B2 | 1/2007 | Tatsuno et al. | |
| 7,280,721 B2 | 10/2007 | McCallion et al. | |
| 2002/0044738 A1 | 4/2002 | Jablonski et al. | |
| 2002/0154372 A1 | 10/2002 | Chung et al. | |
| 2002/0159490 A1 | 10/2002 | Karwacki | |
| 2002/0176659 A1 | 11/2002 | Lei et al. | |
| 2003/0002120 A1 * | 1/2003 | Choa | 359/182 |
| 2003/0067952 A1 | 4/2003 | Tsukiji et al. | |
| 2003/0099018 A1 | 5/2003 | Singh et al. | |
| 2003/0147114 A1 | 8/2003 | Kang et al. | |
| 2003/0193974 A1 | 10/2003 | Frankel et al. | |
| 2003/0210912 A1 | 11/2003 | Leuthold et al. | |
| 2004/0008933 A1 | 1/2004 | Mahgerefteh et al. | |
| 2004/0008937 A1 | 1/2004 | Mahgerefteh et al. | |
| 2004/0036943 A1 | 2/2004 | Freund et al. | |
| 2004/0096221 A1 | 5/2004 | Mahgerefteh et al. | |
| 2004/0218890 A1 | 11/2004 | Mahgerefteh et al. | |
| 2005/0100345 A1 | 5/2005 | Welch et al. | |
| 2005/0111852 A1 | 5/2005 | Mahgerefteh et al. | |
| 2005/0175356 A1 | 8/2005 | McCallion et al. | |
| 2005/0206989 A1 | 9/2005 | Marsh | |
| 2005/0271394 A1 | 12/2005 | Whiteaway et al. | |
| 2005/0286829 A1 | 12/2005 | Mahgerefteh et al. | |
| 2006/0002718 A1 | 1/2006 | Matsui et al. | |
| 2006/0018666 A1 | 1/2006 | Matsui et al. | |
| 2006/0029358 A1 | 2/2006 | Mahgerefteh et al. | |
| 2006/0029396 A1 | 2/2006 | Mahgerefteh et al. | |
| 2006/0029397 A1 | 2/2006 | Mahgerefteh et al. | |
| 2006/0228120 A9 | 10/2006 | McCallion et al. | |
| 2006/0274993 A1 | 12/2006 | Mahgerefteh et al. | |

FOREIGN PATENT DOCUMENTS

| | | |
|---|---|---|
| JP | 62-189832 | 8/1987 |
| JP | 2000-105313 | 9/1998 |
| JP | 11-031859 | 2/1999 |
| JP | 2002-267834 | 7/2001 |
| JP | 2001-291928 | 10/2001 |
| JP | 2001-320328 | 11/2001 |
| JP | 2002-243935 | 8/2002 |
| JP | 2002-267998 | 9/2002 |
| WO | 9905804 | 2/1999 |
| WO | WO 01/17076 | 3/2001 |
| WO | WO 01/18919 | 3/2001 |

OTHER PUBLICATIONS

Alexander et al., Passive Equalization of Semiconductor Diode Laser Frequency Modulation, Journal of Lightwave Technology, Jan. 1989, 11-23, vol. 7, No. 1.

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.

Hyryniewicz, J.V., et al., Higher Order Filter Response in Coupled MicroRing Resonators, IEEE Photonics Technology Letters, Mar. 2000, 320-322, vol. 12, No. 3.

Koch, T. L. et al., Nature of Wavelength Chirping in Directly Modulated Semiconductor Lasers, Electronics Letters, Dec. 6, 1984, 1038-1039, vol. 20, No. 25/26.

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Li, Yuan P., et al., Chapter 8: Silicon Optical Bench Wavelguide Technology, Optical Fiber Communications, 1997, 319-370, vol. 111B, Lucent Technologies, New York.

Little, Brent E., Advances in Microring Resonators, Integrated Photonics Research Conference 2003.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Shalom, Hamutal et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

* cited by examiner

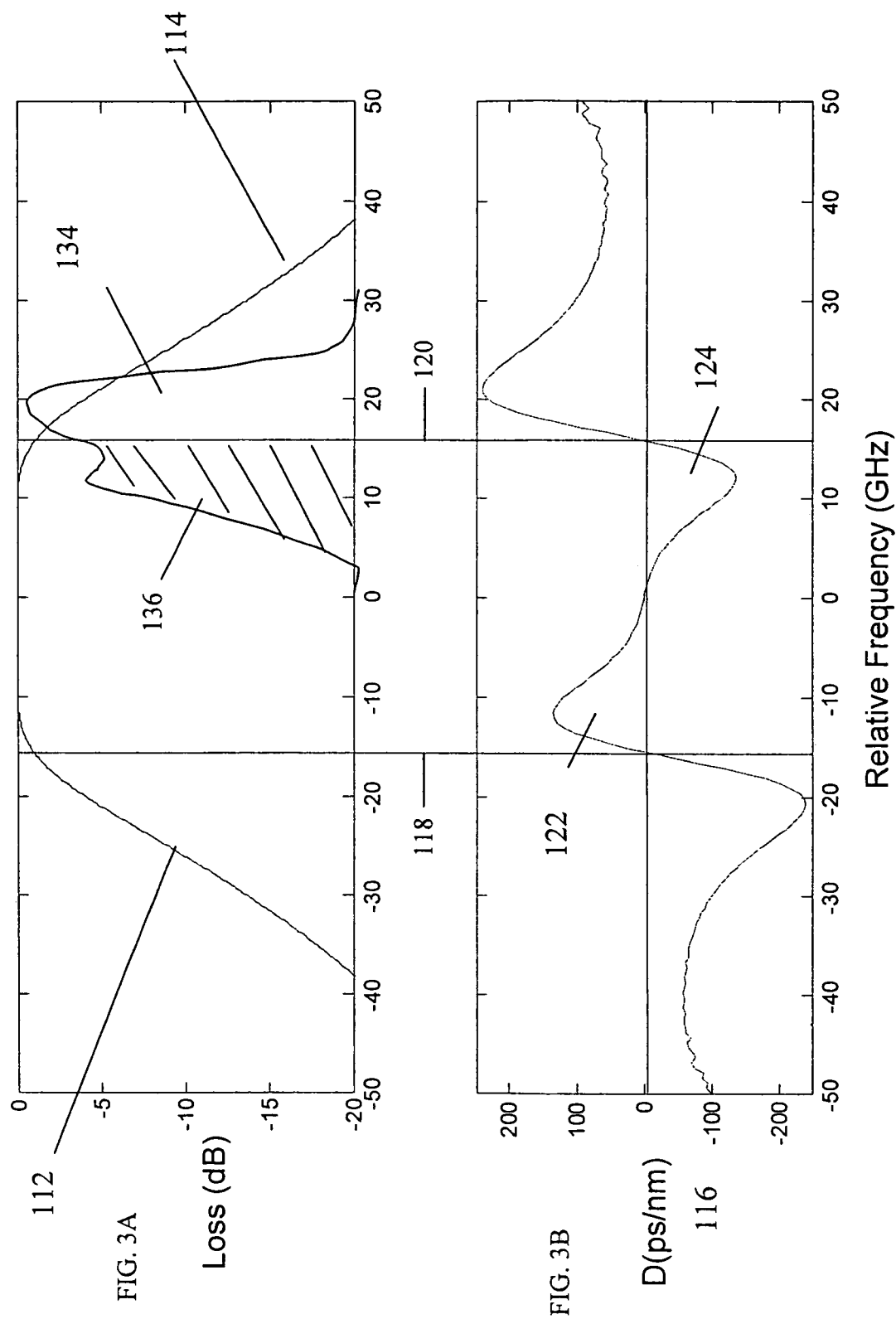

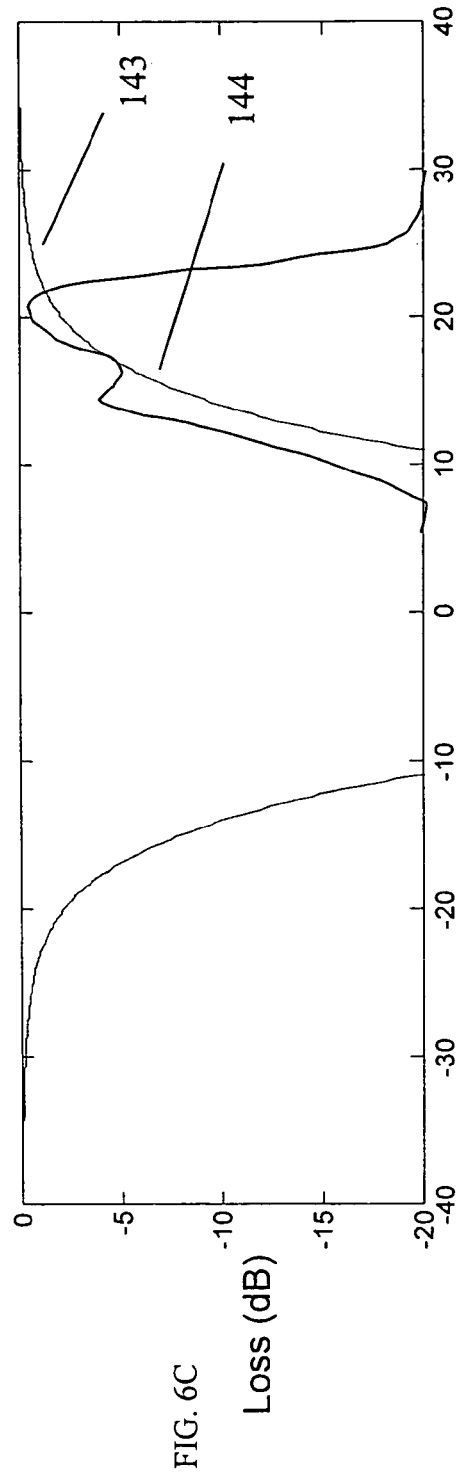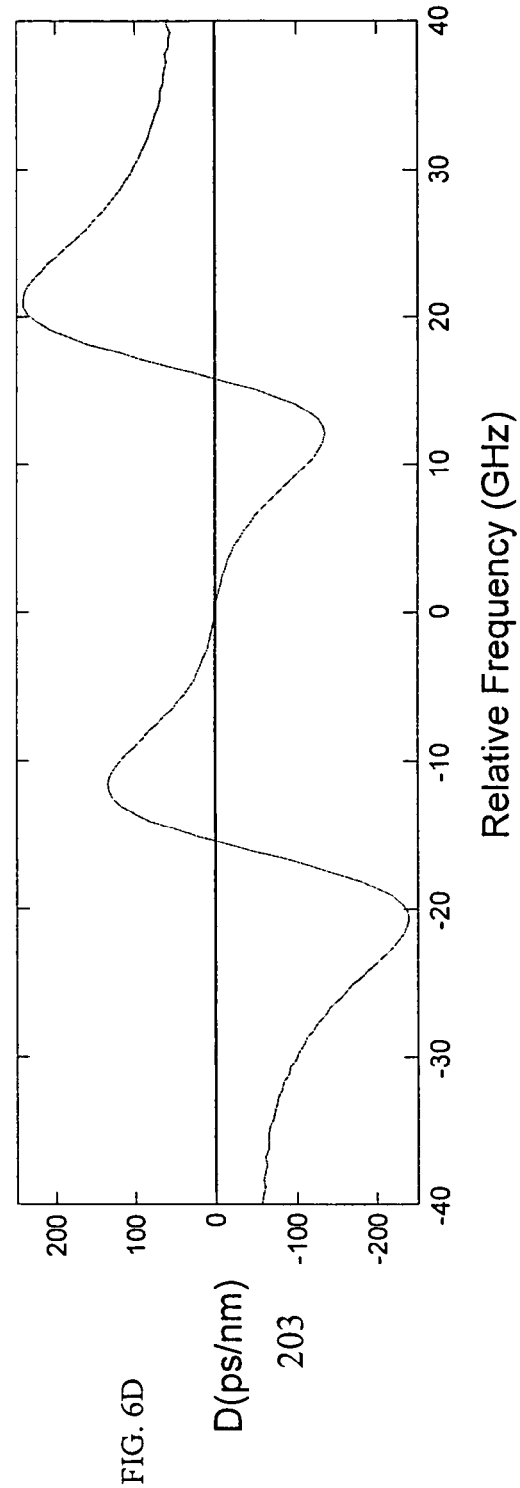
FIG. 6C
FIG. 6D

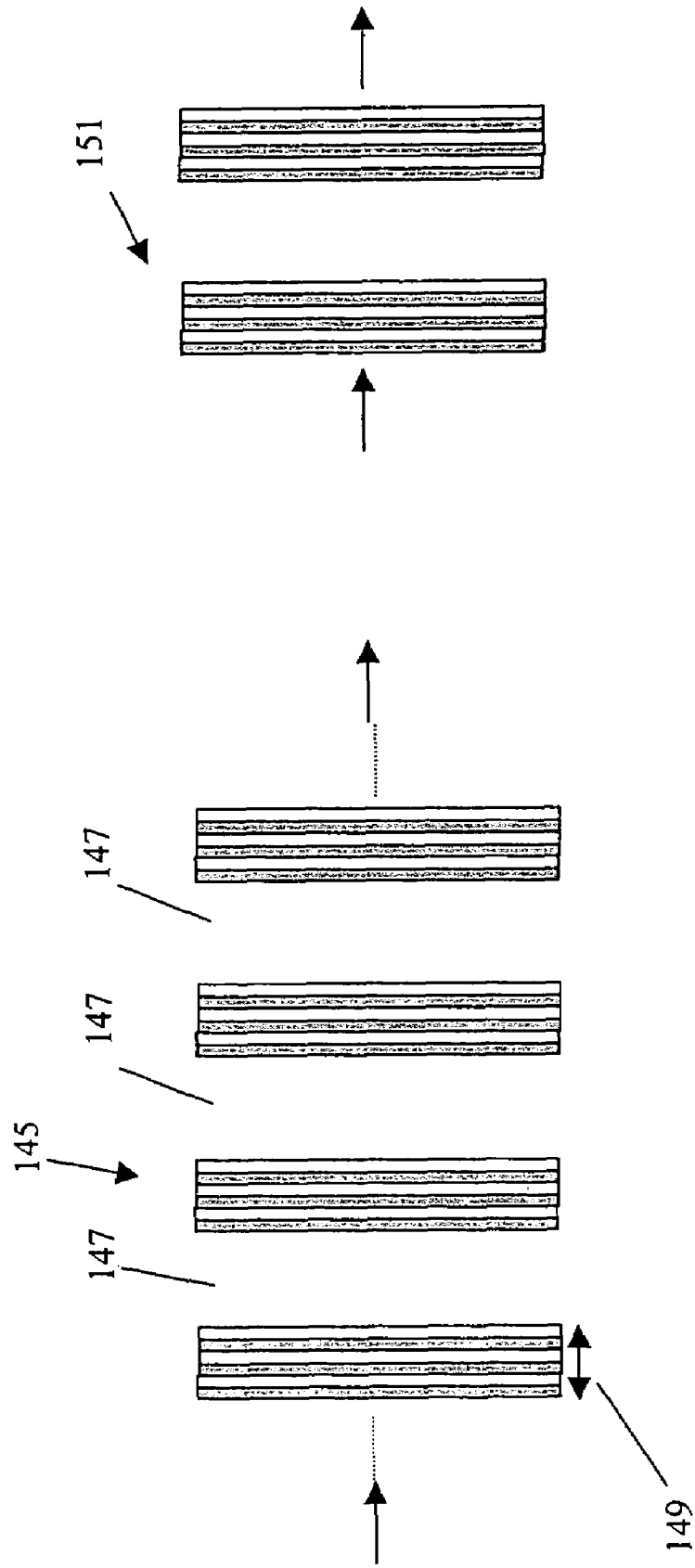

POWER SOURCE FOR A DISPERSION COMPENSATION FIBER OPTIC SYSTEM

This application is a continuation of prior U.S. patent application Ser. No. 10/289,944, filed Nov. 6, 2002 now U.S. Pat. No. 6,963,685 by Daniel Mahgerefteh et al. for POWER SOURCE FOR A DISPERSION COMPENSATION FIBER OPTIC SYSTEM, which claims the benefit of:

(1) U.S. Provisional Patent Application No. 60/395,161 filed Jul. 9, 2002 by Daniel Mahgerefteh et al. for DISPERSION COMPENSATED LASER TRANSMITTER; and (2) U.S. Provisional Patent Application No. 60/401,419, filed Aug. 6, 2002 by Daniel Mahgerefteh et al. for OPTICAL DISCRIMINATOR FOR CONVERTING FREQUENCY MODULATION TO AMPLITUDE MODULATION IN A FIBER OPTICS COMMUNICATION SYSTEM.

The above-identified patent applications are hereby incorporated herein by reference.

BACKGROUND OF THE INVENTION

1. Field of the Invention

This invention generally relates to a power source for a fiber optic system that converts a partially frequency modulated signal into a substantially modulated signal and compensates for dispersion in a transmission fiber.

2. General Background and State of the Art

Fiber optic communication systems use a variety of transmitters to convert electrical digital bits of information into optical signals that are sent through optical fibers. On the other end of the optical fiber is a receiver that converts the optical signal to an electrical signal. The transmitters modulate the signals to form bits of 1s and 0s so that information or data may be carried through the optical fiber. There are a variety of transmitters that modulate the signal in different ways. For example, there are directly modulated transmitters and indirectly modulated transmitters. The directly modulated transmitters offer a compact system having large response to modulation and are integrateable. The directly modulated transmitters are also generally less expensive than the externally modulated transmitters, which require an intensity modulator, usually LiNbO3, following the laser. One of the drawbacks of a directly modulated transmitter, however, is that its output is highly chirped. Chirp is the rapid change in optical frequency or phase that accompanies an intensity modulated signal. Chirped pulses become distorted after propagation through tens of km of dispersive optical fiber, increasing system power penalties to unacceptable levels. This has limited the use of directly modulated laser transmitters to applications with limited distances of tens of km at 2.5 Gb/s as described by P. J. Corvini and T. L. Koch, Journal of Lightwave Technology vol. LT-5, no. 11, 1591 (1987). For higher bit rate applications, the use of directly modulated transmitters may be limited to even shorter distances.

An alternative to directly modulating the laser source is using a laser source that produces a partially frequency modulated signal and an optical discriminator as discussed in UK Patent GB2107147A by R. E. Epworth. In this technique, the laser is initially biased to a current level high above threshold. A partial amplitude modulation of the bias current is applied so that the average power output remains high. The partial amplitude modulation also leads to a partial but significant modulation in the frequency of the laser output, synchronous with the power amplitude changes. This partially frequency modulated output may then be applied to a filter, such as a Fabry Perot filter, which is tuned to allow light only at certain frequencies to pass through. This way, a partially frequency modulated signal is converted into a substantially amplitude modulated signal. That is, frequency modulation is converted into amplitude modulation. This conversion increases the extinction ratio of the input signal and further reduces the chirp.

Since Epworth, a number of variations from his technique have been applied to increase the extinction ratio from the signal output of the laser. For example, N. Henmi describes a very similar system in U.S. Pat. No. 4,805,235, also using a free-space interferometer. Huber U.S. Pat. No. 5,416,629, Mahgerefteh U.S. Pat No. 6,104,851, and Brenner U.S. Pat No. 6,115,403 use a fiber Bragg grating discriminator in similar configurations. In the more recent work, it has also been recognized that a frequency-modulated transmitter with a frequency discriminator produces an output with lower chirp, which reduces the pulse distortion upon propagation through a communication fiber. Chirp is a time dependent frequency variation of an optical signal and generally increases the optical bandwidth of a signal beyond the Fourier-transform limit. Chirp can either improve or degrade the optical pulse shape after propagation through a dispersive fiber, depending on the sign and exact nature of the chirp. In the conventional directly modulated laser transmitter, chirp causes severe pulse distortion upon propagation through the optical fiber. This is because the speed of light in the dispersive medium is frequency dependent, frequency variations of pulses may undergo different time delays, and thus the pulse may be distorted. If the propagation distance through the medium is long as in the case of optical fibers, the pulse may be dispersed in time and its width broadened, which has an undesirable effect.

In the above systems, the discriminator is operated to increase the extinction ratio of the input signal or to remove some component of the signal in favor of the other. As such, only the amplitude variation of the discriminator has been utilized. In addition, these systems have mainly dealt with lower bit rate applications. At low bit rates, the spectrum of a modulated laser biased above its threshold includes two carriers, each carrying the digital signal used to modulate the laser. The wavelengths of the two peaks are separated by 10 GHz to 20 GHz depending on the laser and the bias. Hence, a variety of optical discriminators, Fabry-Perot, Mach-Zehnder, etc. may be used to resolve the two peaks, generally discarding the 0s bits and keeping the 1s bits, thereby increasing the extinction ratio at the output.

A Fabry-Perot filter is formed by two partially reflecting mirror surfaces, which are separated by a small gap on the order of a few micrometers. The cavity is either an air gap or a solid material formed by deposition or cut and polish method. The transmission of a Fabry-Perot filter consists of periodic peaks in optical frequency separated by the so-called free-spectral range (FSR), which is inversely proportional to the thickness of the gap. The steepness of the peaks is determined by the reflectivities of the two mirrors. However, the steeper the transmission edges, the narrower the pass-band of the filter. As such, Fabry-Perot filter may provide the steeper transmission edges or slope, but it does not provide the broad enough bandwidth for high bit rate applications such as 10 Gb/s.

At higher bit rates, the spectrum of the frequency modulated signal becomes more complicated and the choice of discriminators that may be used is limited. At high bit rates around 10 Gb/s, the information bandwidth becomes comparable to the frequency excursion of the laser, which is typically between 10 GHz to 15 GHz. In addition, the transient chirp that arises at the transitions between 1s and 0s broadens to complicate the spectrum further. In order to separate the 1 and 0 bits with the extinction ratio of 10 dB, the slope of the discriminator should be greater than 1 dB/GHz, while passing 10 Gb/s information. Under these performance criteria, a Fabry-Perot filter may not work because the bandwidth and slope characteristics of Fabry-Perot filters are such that the steeper the transmission edges, the narrower the pass-bandwidth of the filter. As illustrated in FIGS. 1A and 1B, a Fabry-Perot discriminator with 1 dB/GHz slope may only have about 3 GHz bandwidth. Such limited bandwidth can severely distort a 10 Gb/s signal such that the FM modulated transmitter with a Fabry-Perot filter may not work at this bit rate. Others have tried fiber Bragg gratings for high bit rate applications, but these are sensitive to temperature and require separate package with temperature stabilization. Therefore, there still is a need for a discriminator that can operate with a FM modulated source at high bit rates without being sensitive to temperature changes.

SUMMARY OF THE INVENTION

This invention provides an optical discriminator capable of operating with a frequency modulated (FM) source at high bit rates and having dispersion that is opposite sign of the dispersion in the transmission fiber to neutralize at least some portion of the dispersion in the fiber. With the discriminator providing dispersion that is opposite sign of the dispersion in the fiber, signal degradation due to dispersion in the fiber is minimized. This invention also provides a modulated laser source and a discriminator system that compensates for the fiber dispersion as well as converting a partially frequency modulated signal into a substantially amplitude modulated signal. With the discriminator that counters the dispersion in the fiber, the laser source may be directly modulated for longer reach applications.

The discriminator may be a variety of filters such as a coupled multi cavity (CMC) filter to enhance the fidelity of converting a partially frequency modulated signal into a substantially amplitude modulated signal as well as introducing enhanced dispersion that is opposite sign of the dispersion in the fiber so that the optical signal may propagate further distances without being distorted. This invention may also provide a modulated laser source that is communicatably coupled to an optical filter where the filter is adapted to lock the wavelength of a laser source as well as converting the partially frequency modulated laser signal into a substantially amplitude modulated signal.

Many modifications, variations, and combinations of the methods and systems and apparatus of a dispersion compensated optical filter are possible in light of the embodiments described herein. The description above and many other features and attendant advantages of the present invention will become apparent from a consideration of the following detailed description when considered in conjunction with the accompanying drawings.

BRIEF DESCRIPTION OF THE FIGURES

A detailed description with regard to the embodiments in accordance with the present invention will be made with reference to the accompanying drawings.

DESCRIPTION OF THE DRAWINGS

Figure 1A:
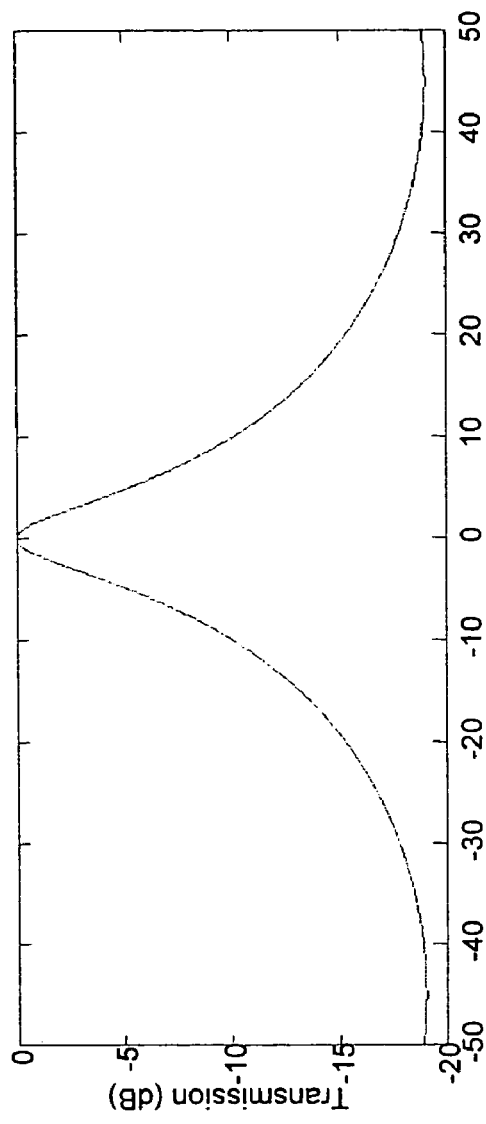

FIG. 1A illustrate a graph with the transmission and dispersion of a Fabry-Perot filter with about 1 dB/GHz discriminator slope.

Figure 1B:
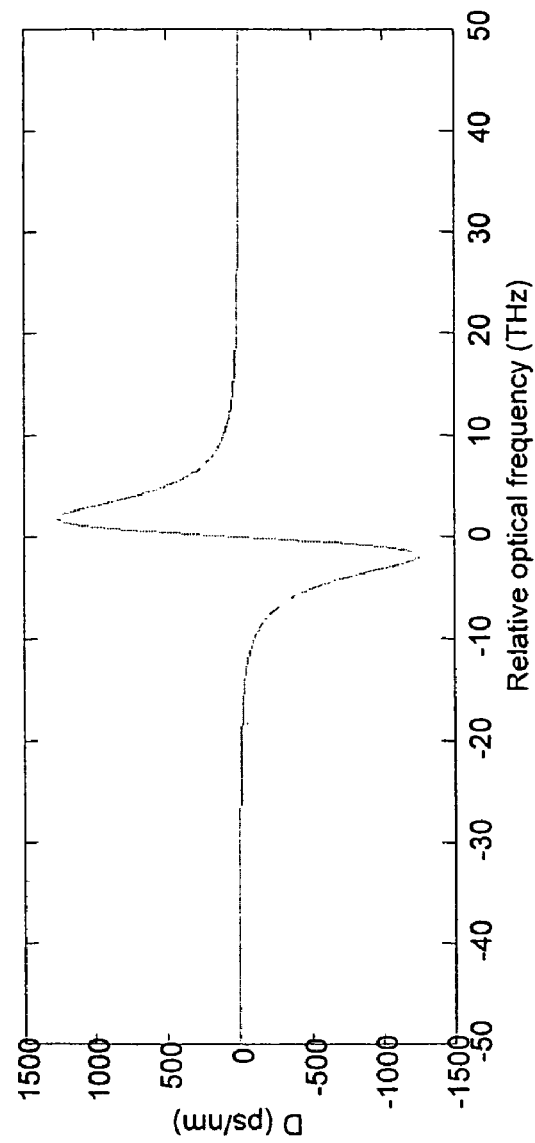

FIG. 1B illustrates the bandwidth of the Fabry-Perot filter of FIG. 1A.

Figure 2:
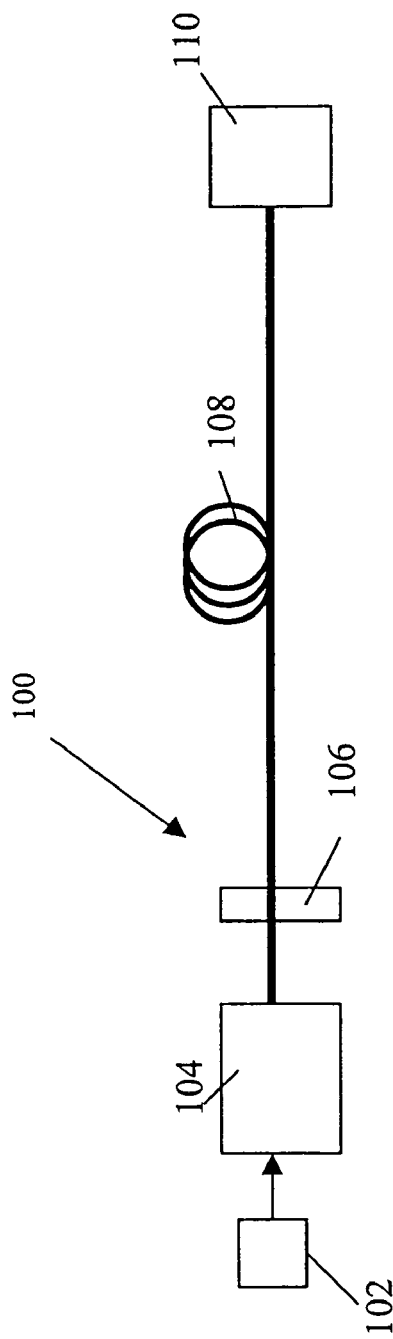

FIG. 2 illustrate a fiber optic system including a directly FM modulated laser, and a transmission type optical discriminator that compensates at least partially for the dispersion of the fiber.

FIG. 3A illustrates optical signal on a negative transmission edges of a coupled multi-cavity (CMC) filter versus an optical frequency.

FIG. 3B illustrates corresponding dispersion of the CMC filter in FIG. 3A versus the optical frequency.

Figures 3C, 3D:
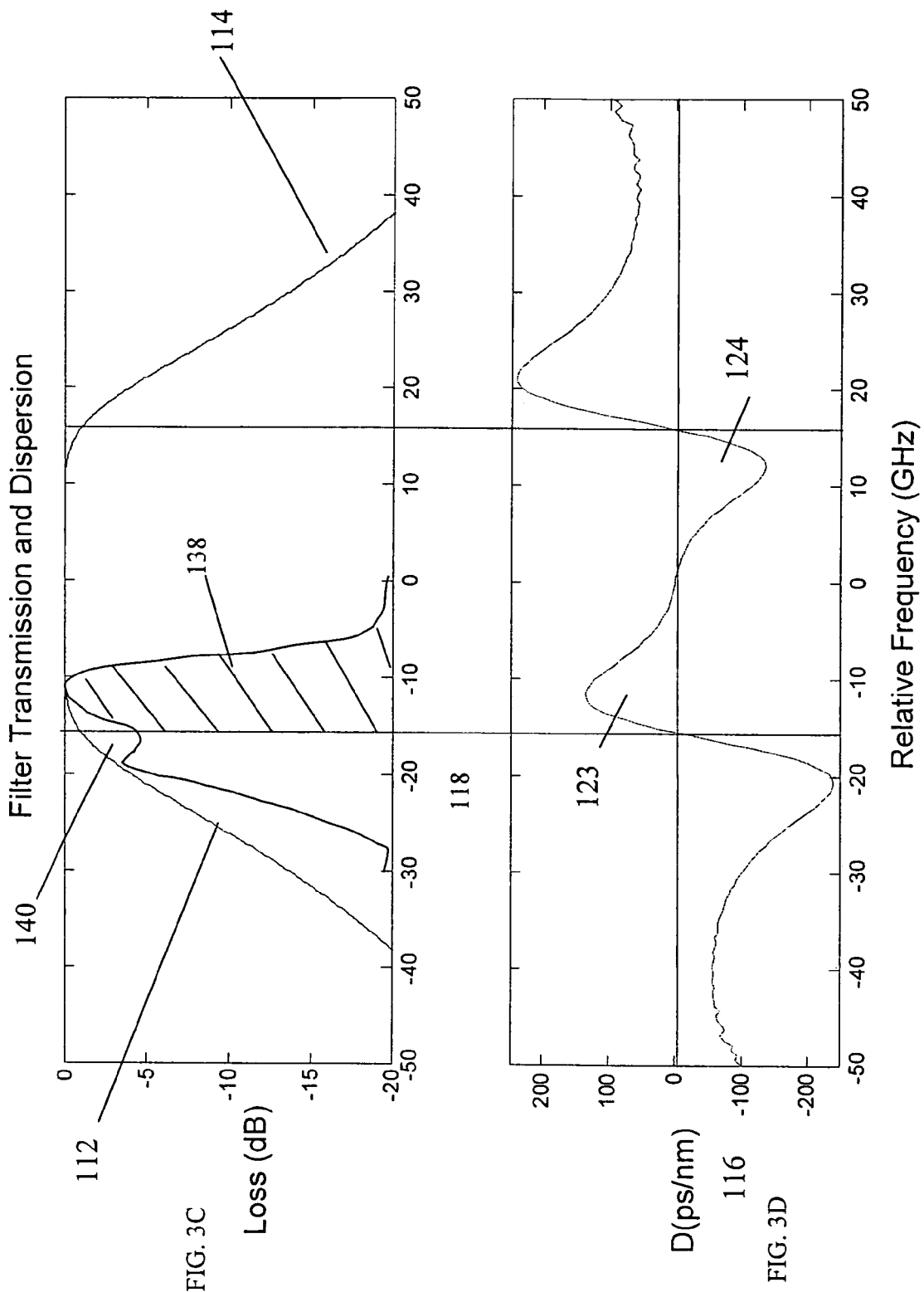

FIG. 3C illustrates optical signal on a positive transmission edges of the CMC filter according to FIG. 3A.

FIG. 3D illustrates corresponding dispersion of the CMC filter in FIG. 3A versus the optical frequency.

Figure 4:
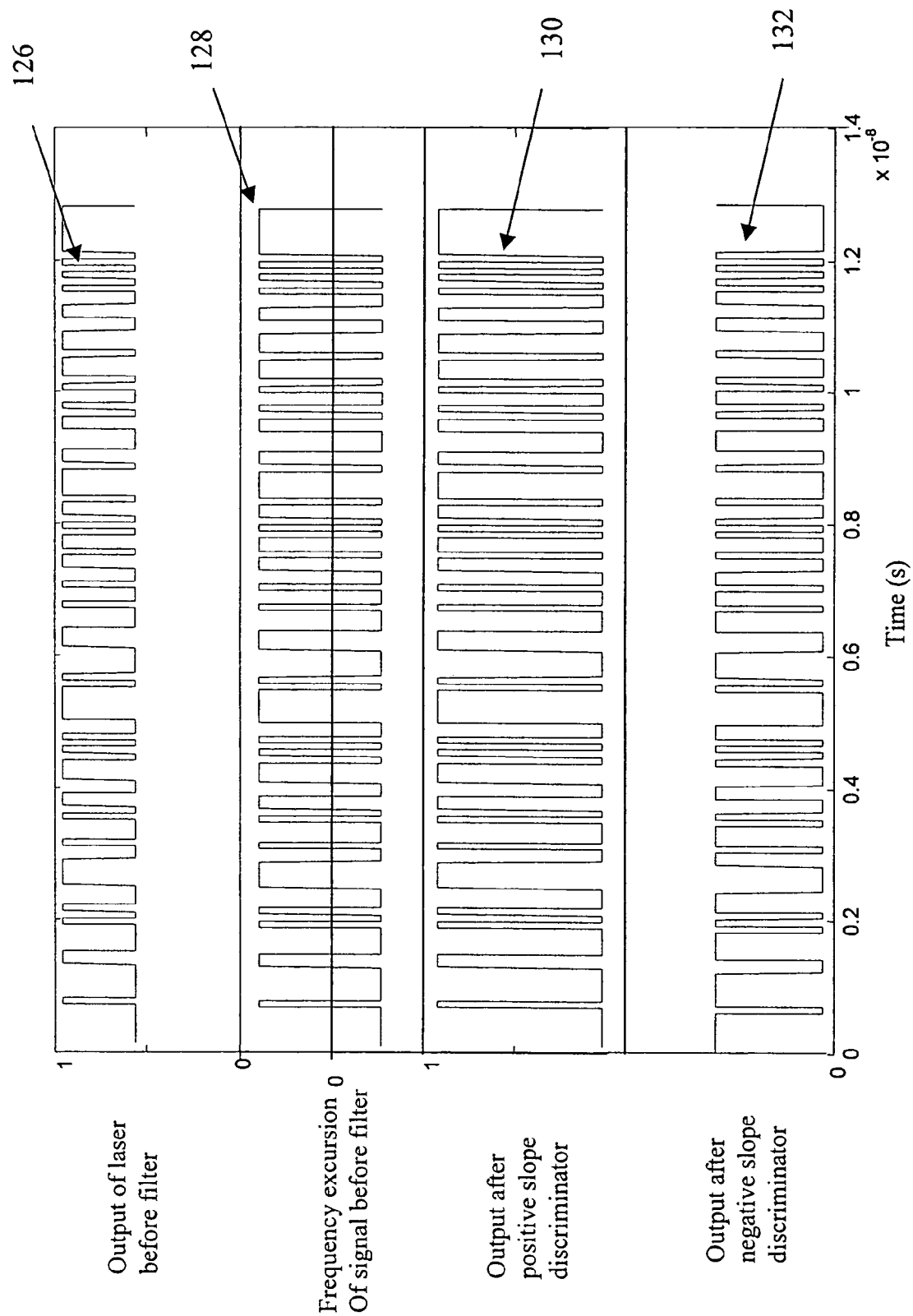

FIG. 4 illustrates output waveforms of transmitter, frequency excursion and output after filters with positive or negative slope.

Figure 5:
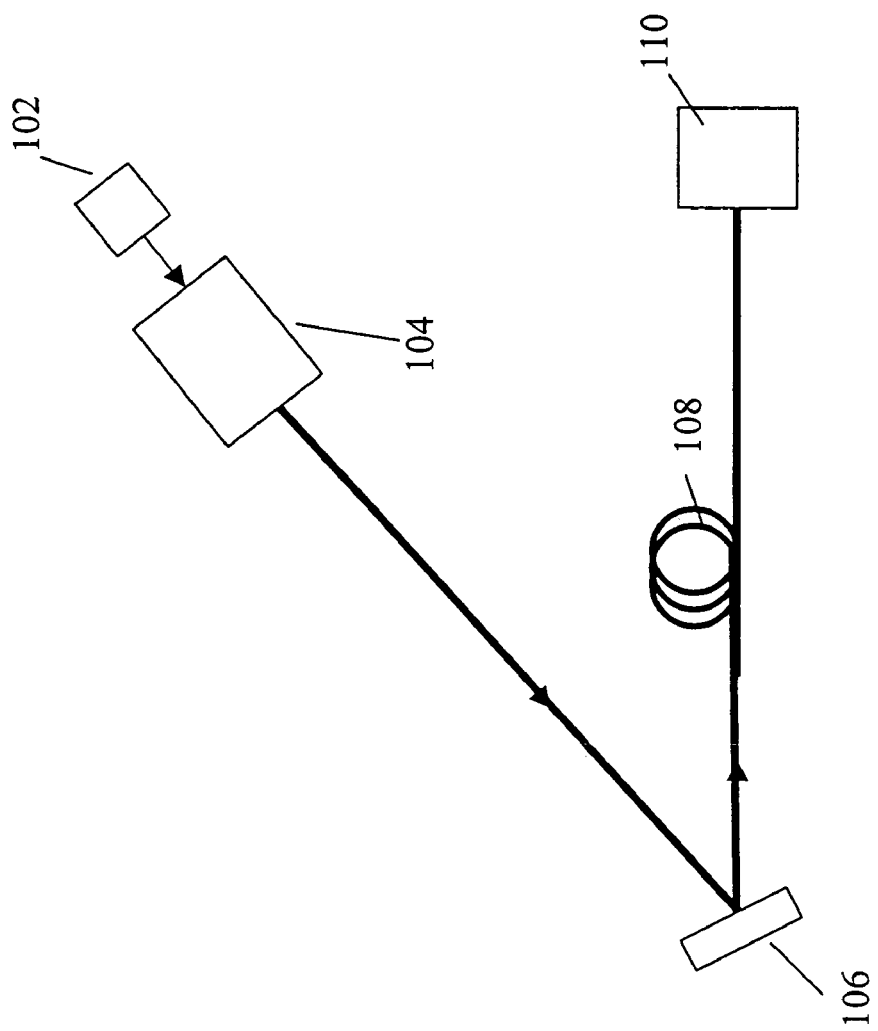

FIG. 5 illustrates a fiber optic system including a directly FM modulated laser, and a reflection type optical discriminator that also compensated partially for the dispersion in the fiber.

Figure 6A:
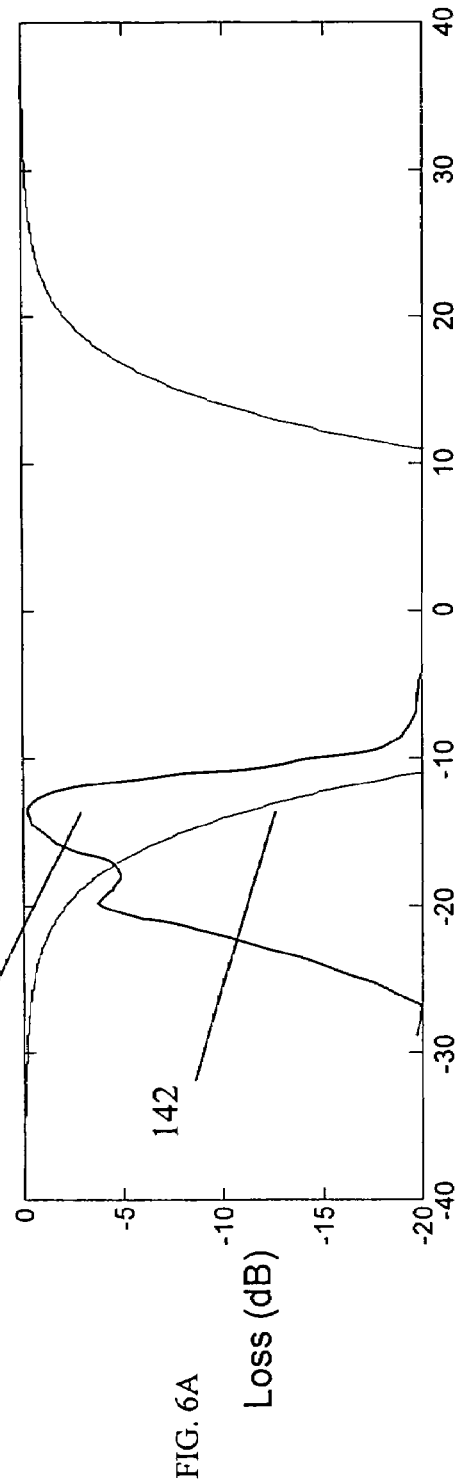

FIG. 6A illustrates optical signal on a negative slope of a reflection side of a CMC filter.

Figure 6B:
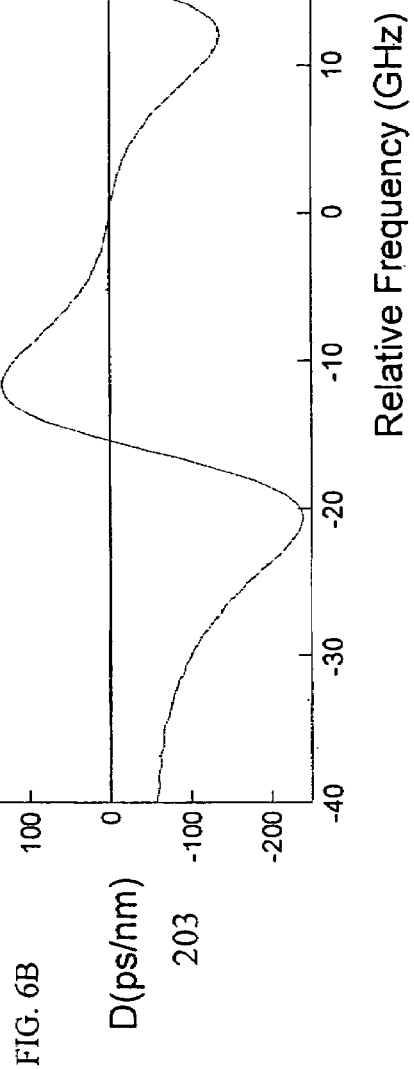

FIG. 6B illustrates the corresponding dispersion of the CMC filter in FIG. 6A versus the optical frequency.

FIG. 6C illustrates optical signal on a positive slope of a reflection side of a CMC filter.

FIG. 6D illustrates the corresponding dispersion of the CMC filter in FIG. 6C versus the optical frequency.

FIG. 7A illustrates a structure of a CMC filter.

FIG. 7B illustrates a structure of a Fabry-Perot filters.

Figure 8:
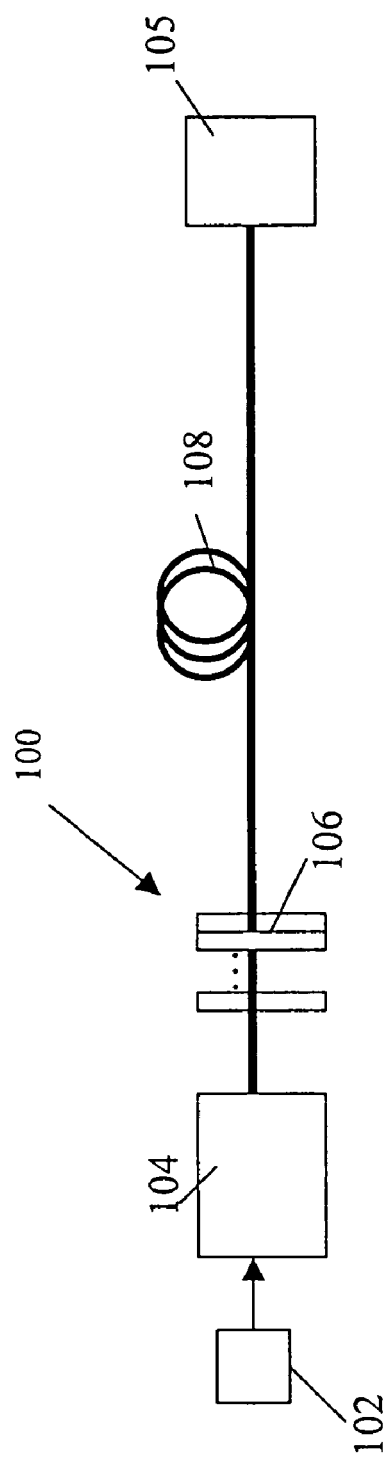

FIG. 8 illustrates a fiber optic system including a directly FM modulated laser, and a multicavity etalon filter with dispersion sign opposite to that of transmission fiber at a multiplicity of equally spaced wavelengths.

Figure 9:
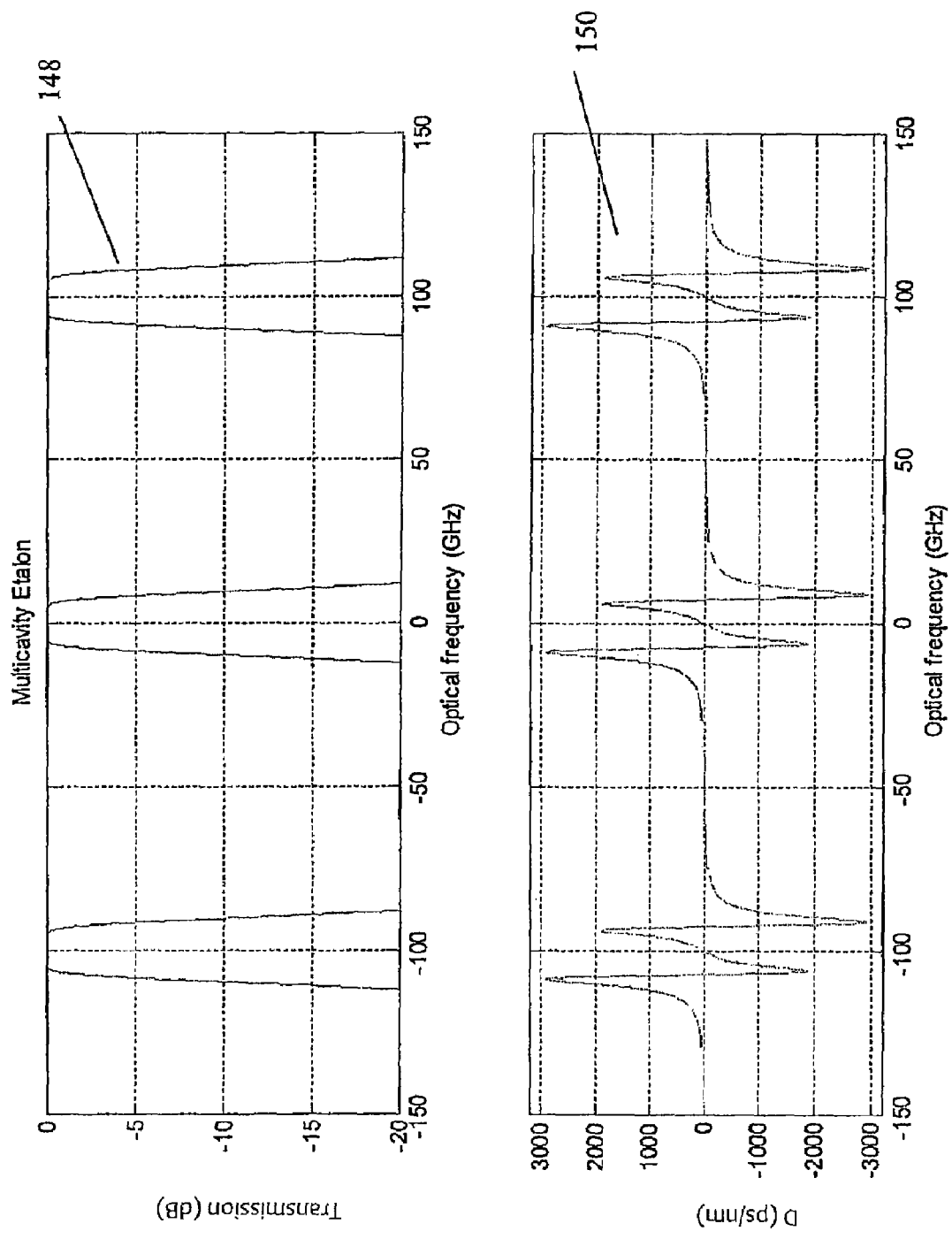

FIG. 9 illustrates transmission and dispersion of a multicavity etalon filter.

Figure 10:
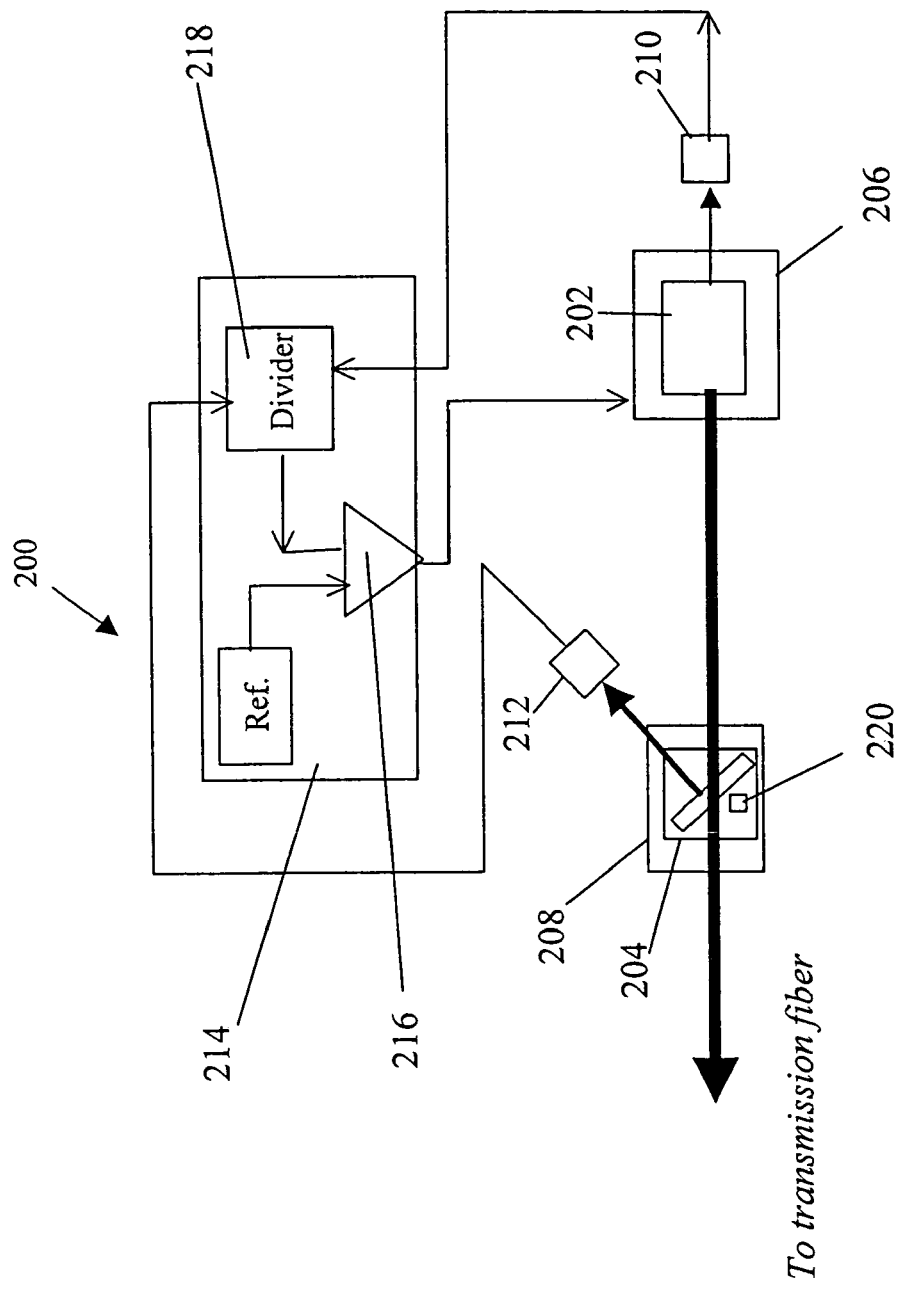

FIG. 10 illustrates a laser optic system including a circuit for locking laser wavelength to the edge of a transmission type optical discriminator.

Figure 11:
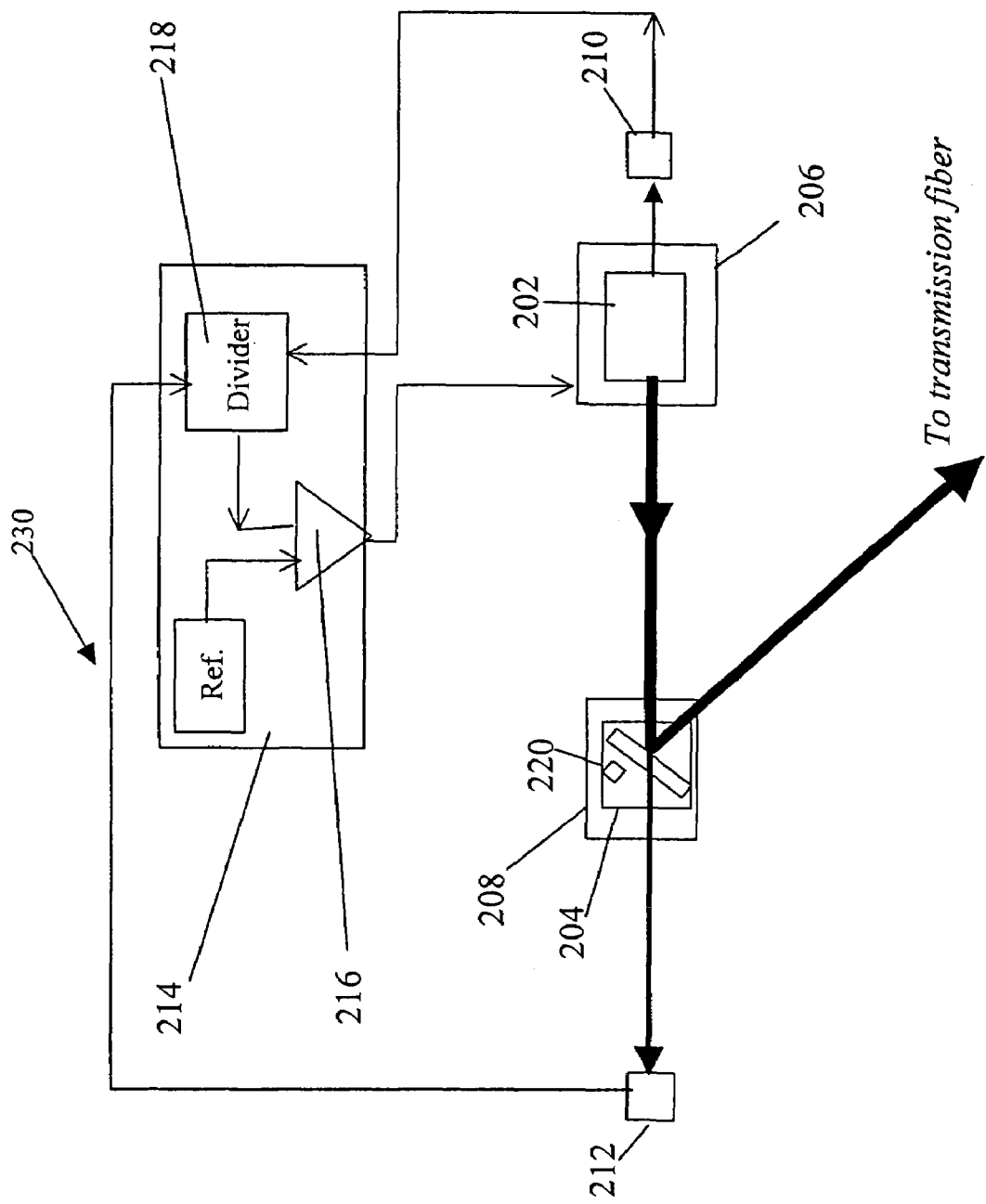

FIG. 11 illustrates a laser optic system including a circuit for locking laser wavelength to edge of a reflection type optical discriminator.

Figure 12:
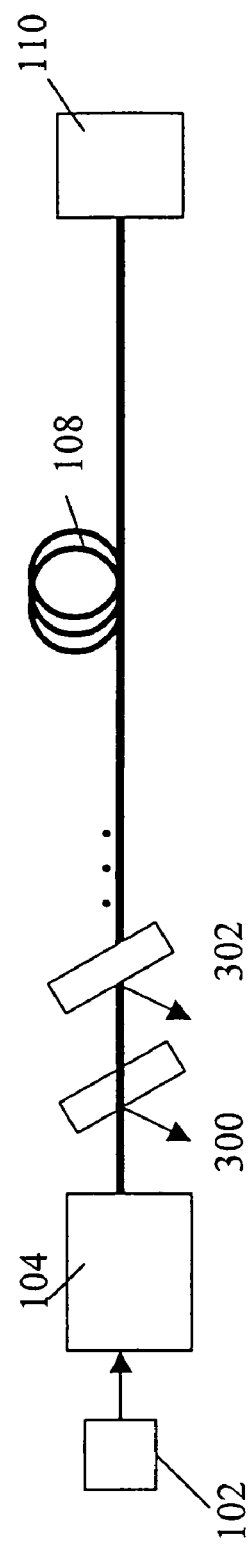

FIG. 12 illustrates a fiber optic system including a directly FM modulated laser, and a cascade of transmission type optical discriminators having a total dispersion that has opposite sign to the dispersion of the transmission fiber.

Figure 13:
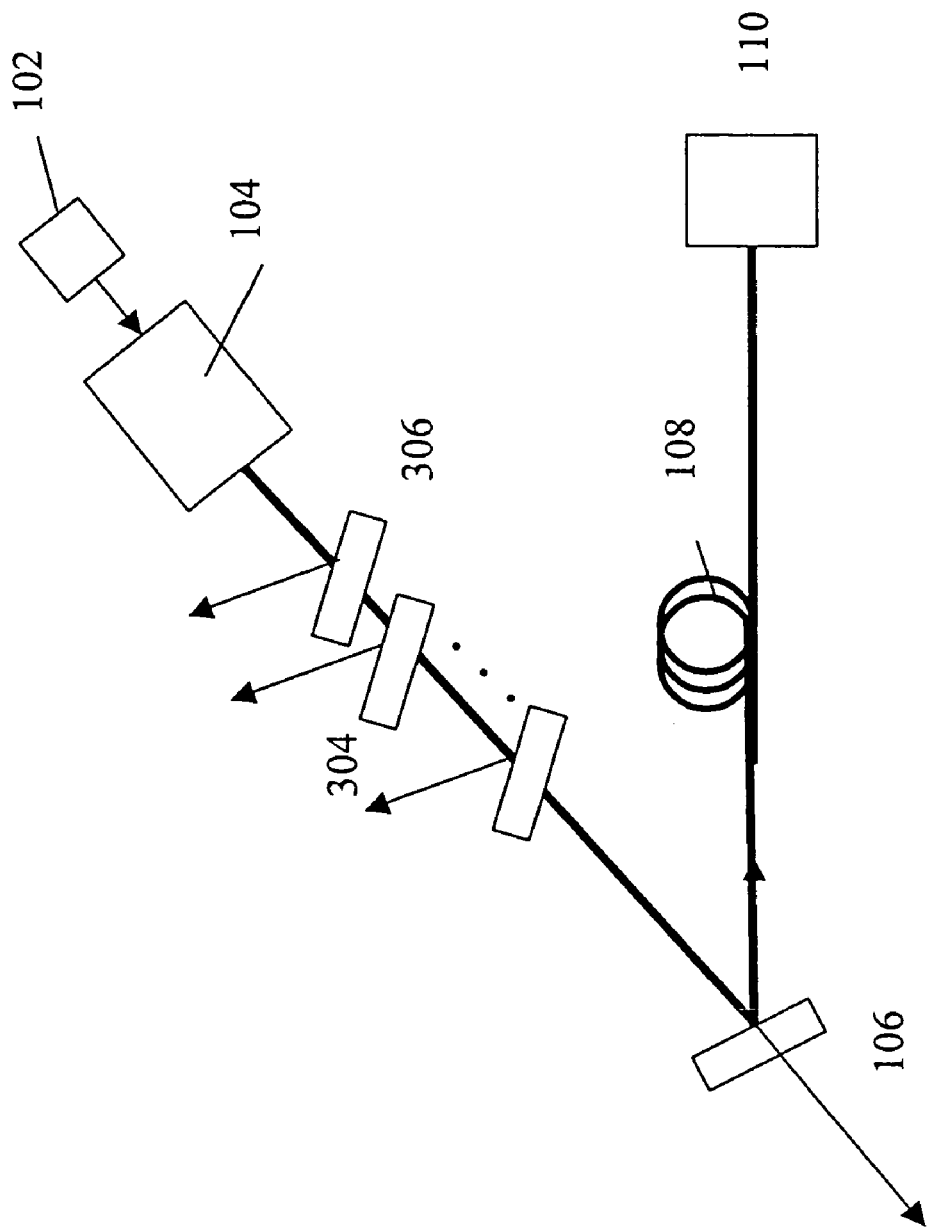

FIG. 13 illustrates a fiber optic system including a directly FM modulated laser, and a cascade of reflection type optical discriminators having a total dispersion that has opposite sign to the dispersion of the transmission fiber.

Figure 14:
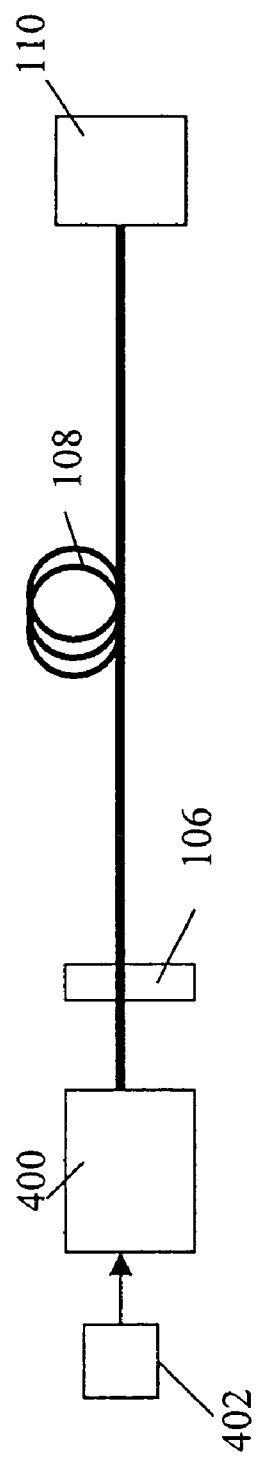

FIG. 14 illustrates a fiber optic system including a FM modulated source, and an optical discriminator having a total dispersion that has opposite sign to the dispersion of the transmission fiber.

Figure 15:
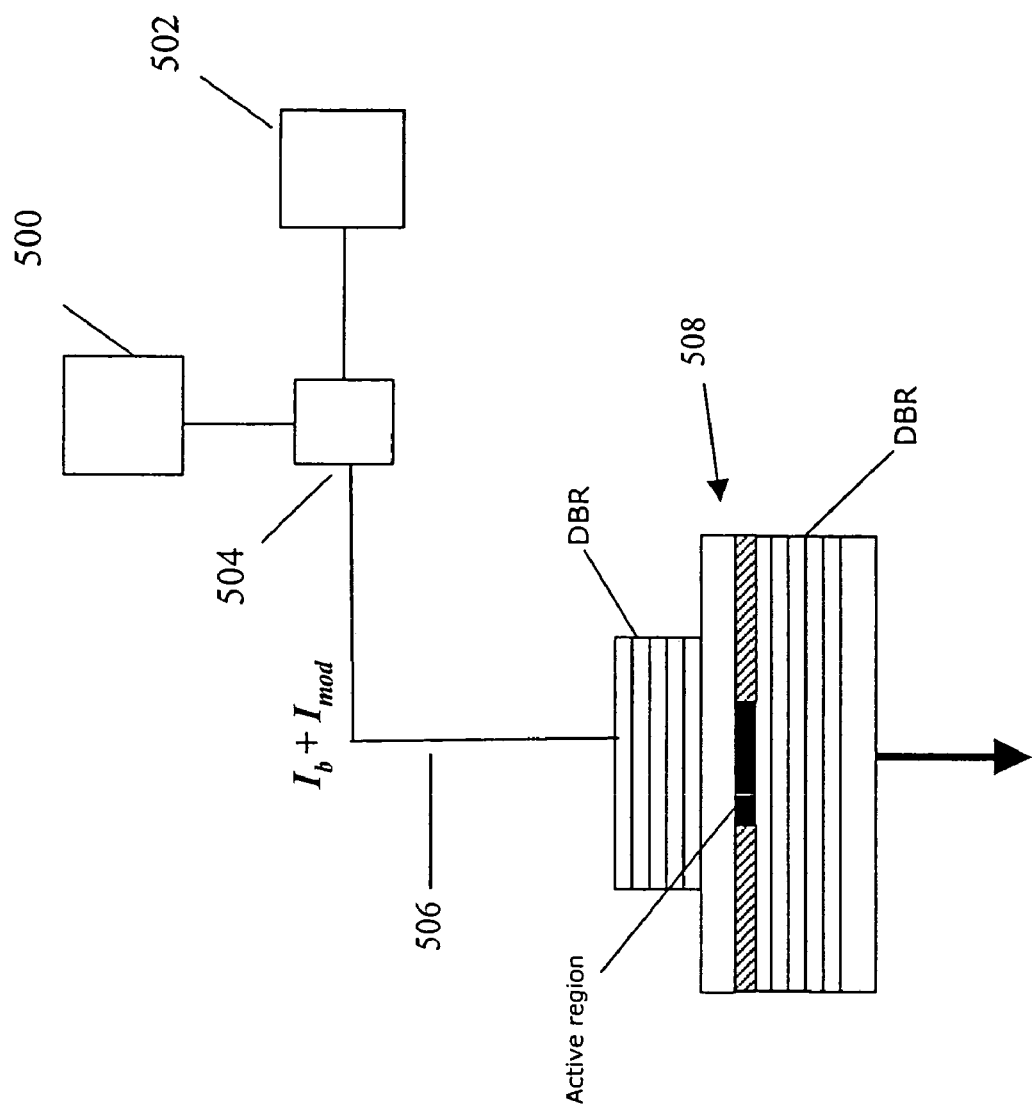

FIG. 15 illustrates a fiber optic system including a vertical cavity surface emitting laser source and a method for frequency modulation.

Figure 16:
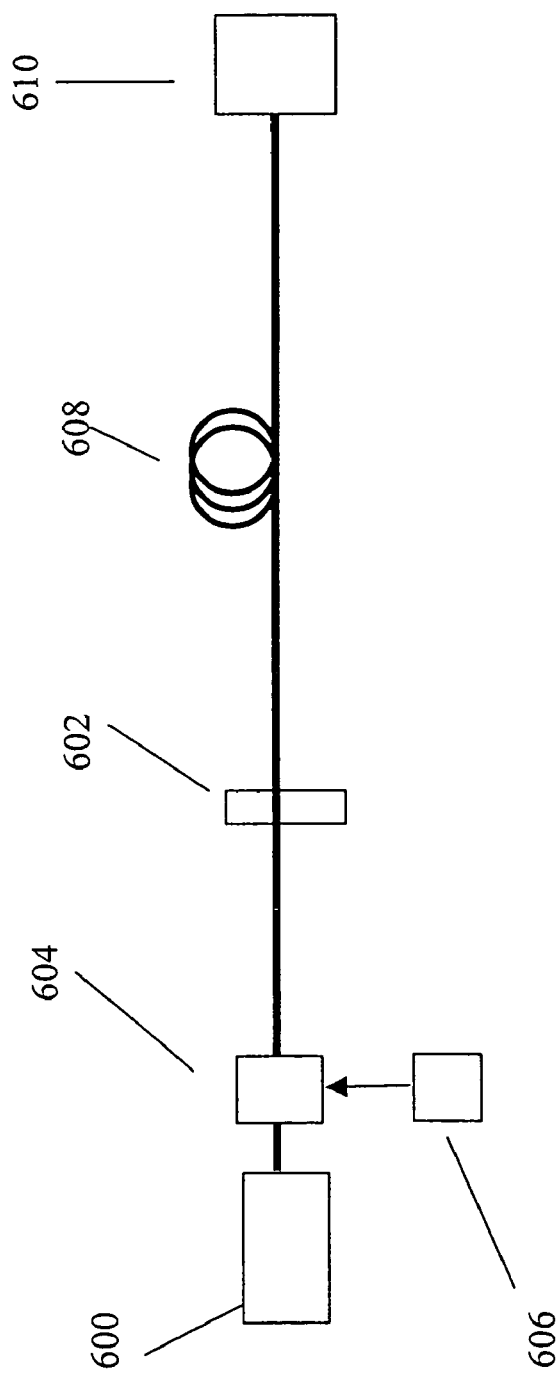

FIG. 16 illustrates a fiber optic system including a continuous wave (CW) laser, an external frequency modulator, and an optical discriminator having a total dispersion that has opposite sign to the dispersion of the transmission fiber.

Figure 17:
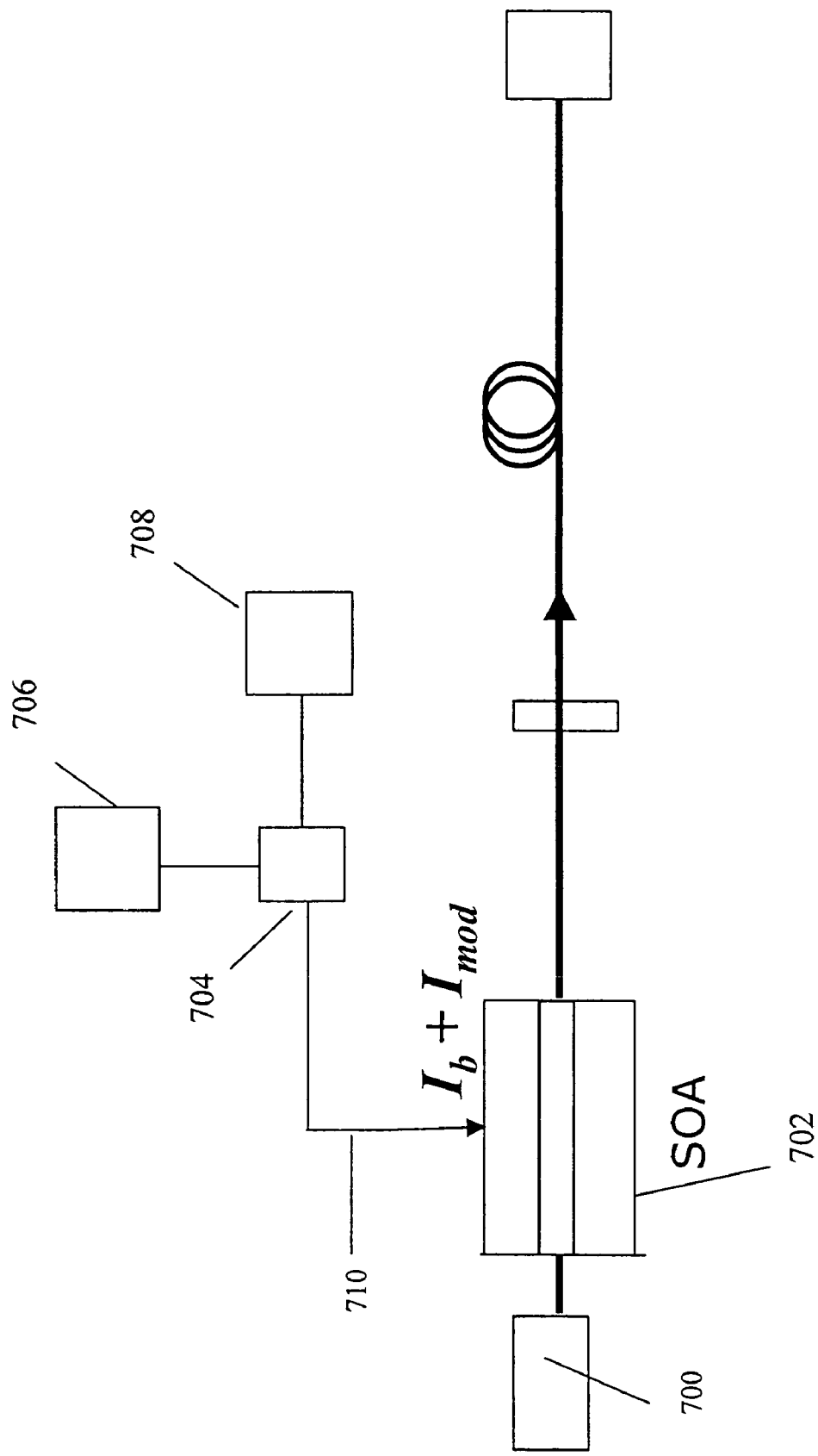

FIG. 17 illustrates a fiber optic system including a CW laser, semiconductor optical amplifier phase modulator, and an optical discriminator having a total dispersion that has opposite sign to the dispersion of the transmission fiber.

Figure 18:
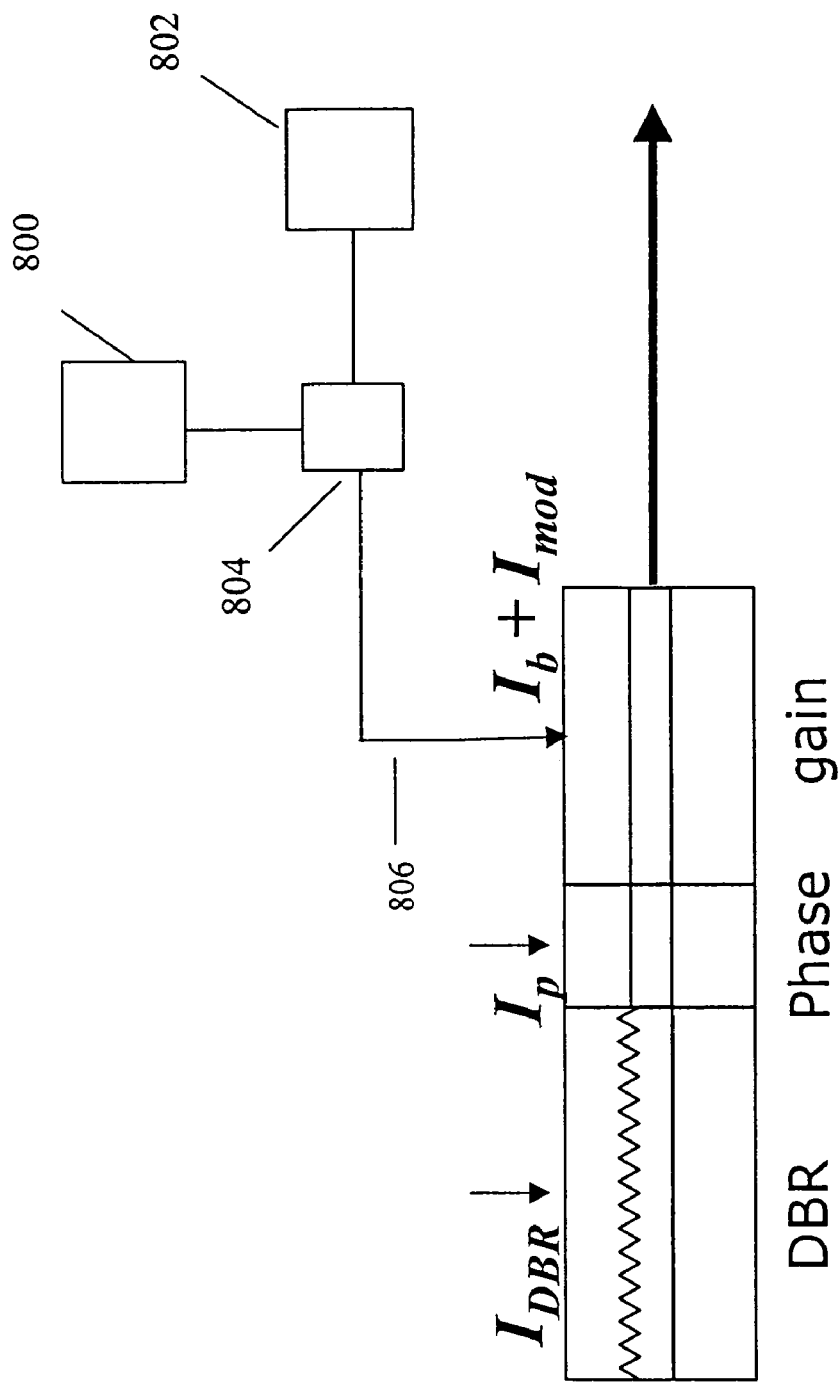

FIG. 18 illustrates a distributed bragg reflector (DBR) laser and modulating the gain section for frequency modulation.

Figure 19:
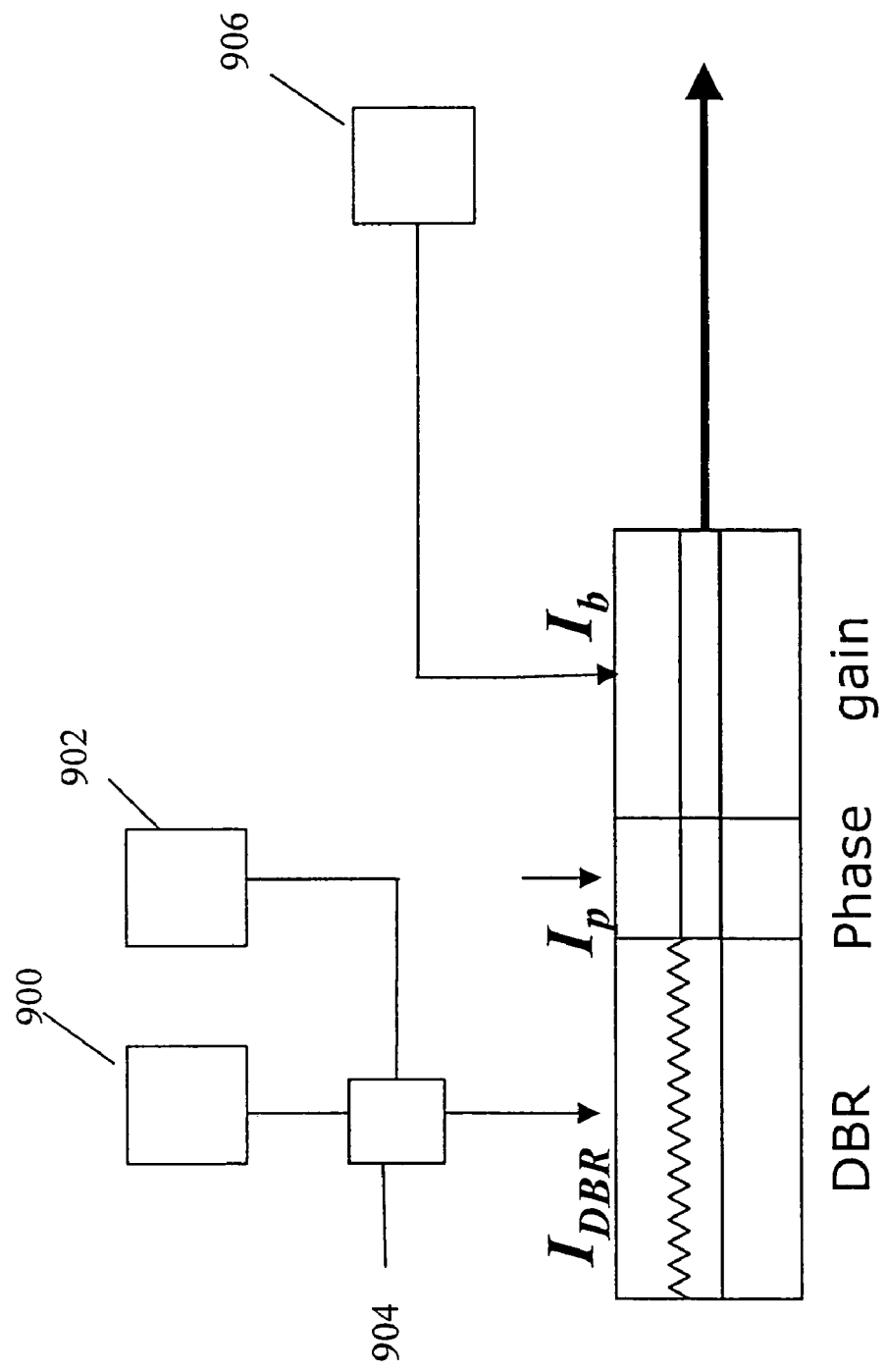

FIG. 19 illustrates a DBR laser and modulating the DBR section for frequency modulation.

Figure 20:
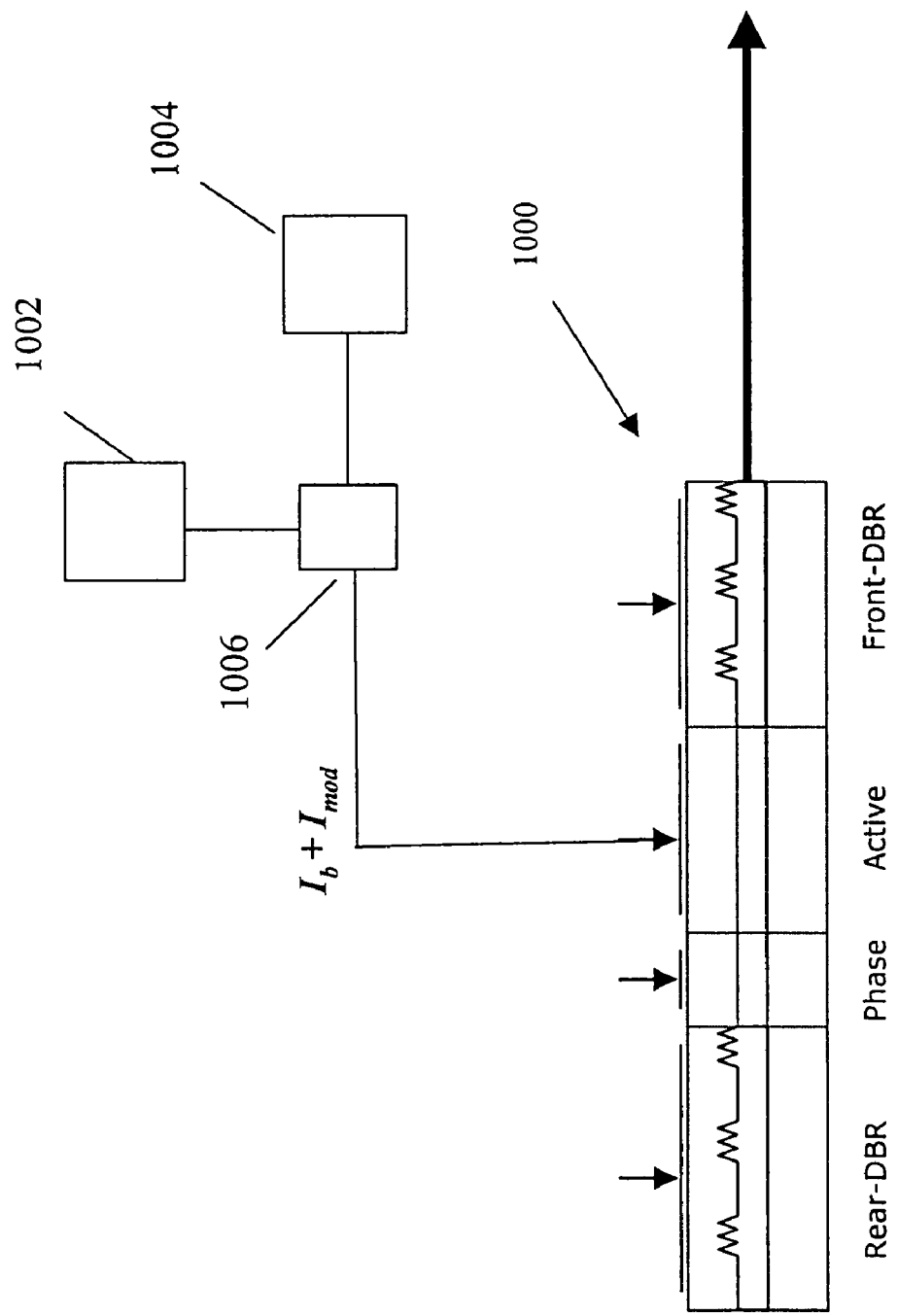

FIG. 20 illustrates a sampled grating distributed Bragg reflector laser (SGDBR) and modulating the gain section for frequency modulation.

Figure 21:
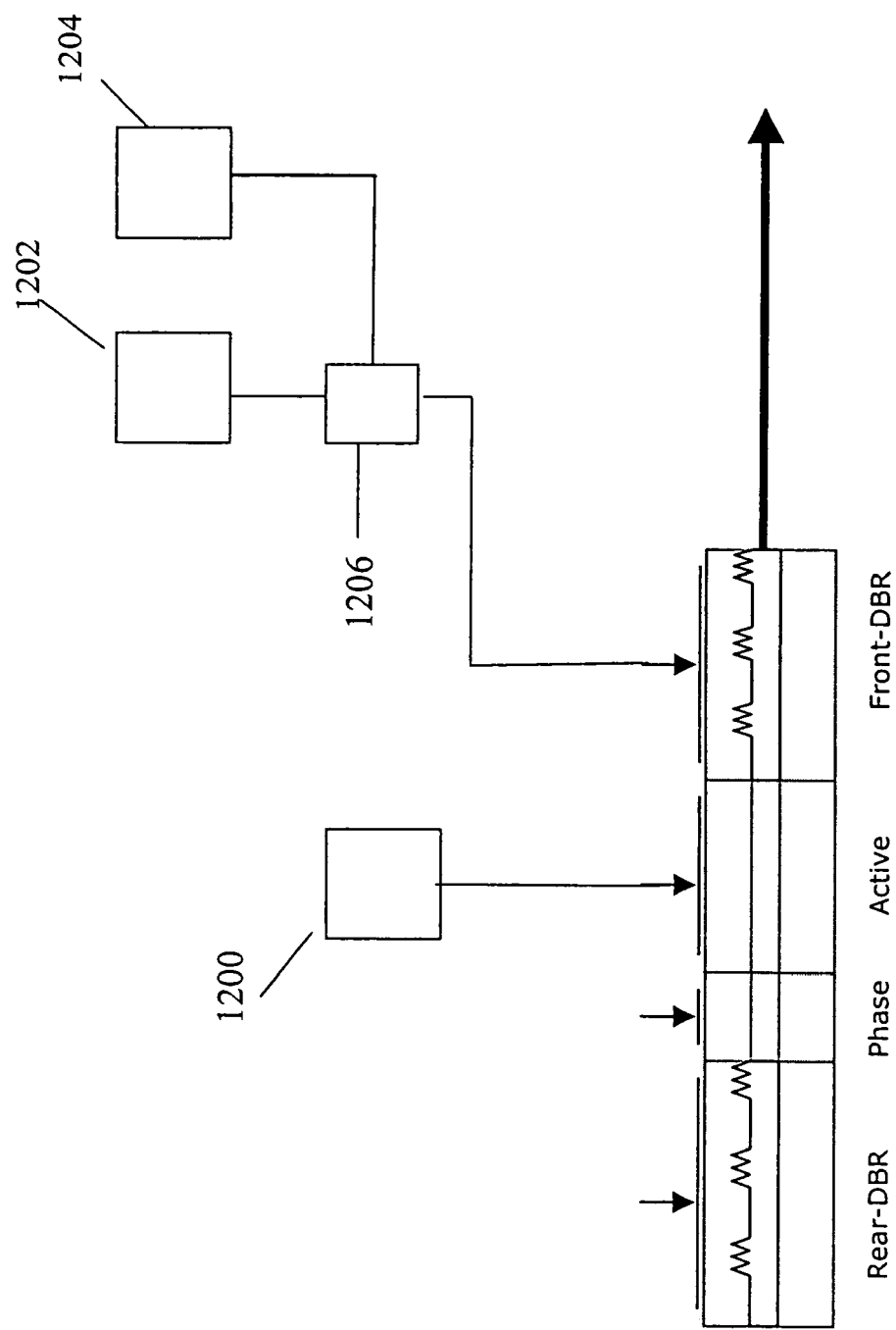

FIG. 21 illustrates a SGDBR and modulating the front DBR section for frequency modulation.

Figure 22:
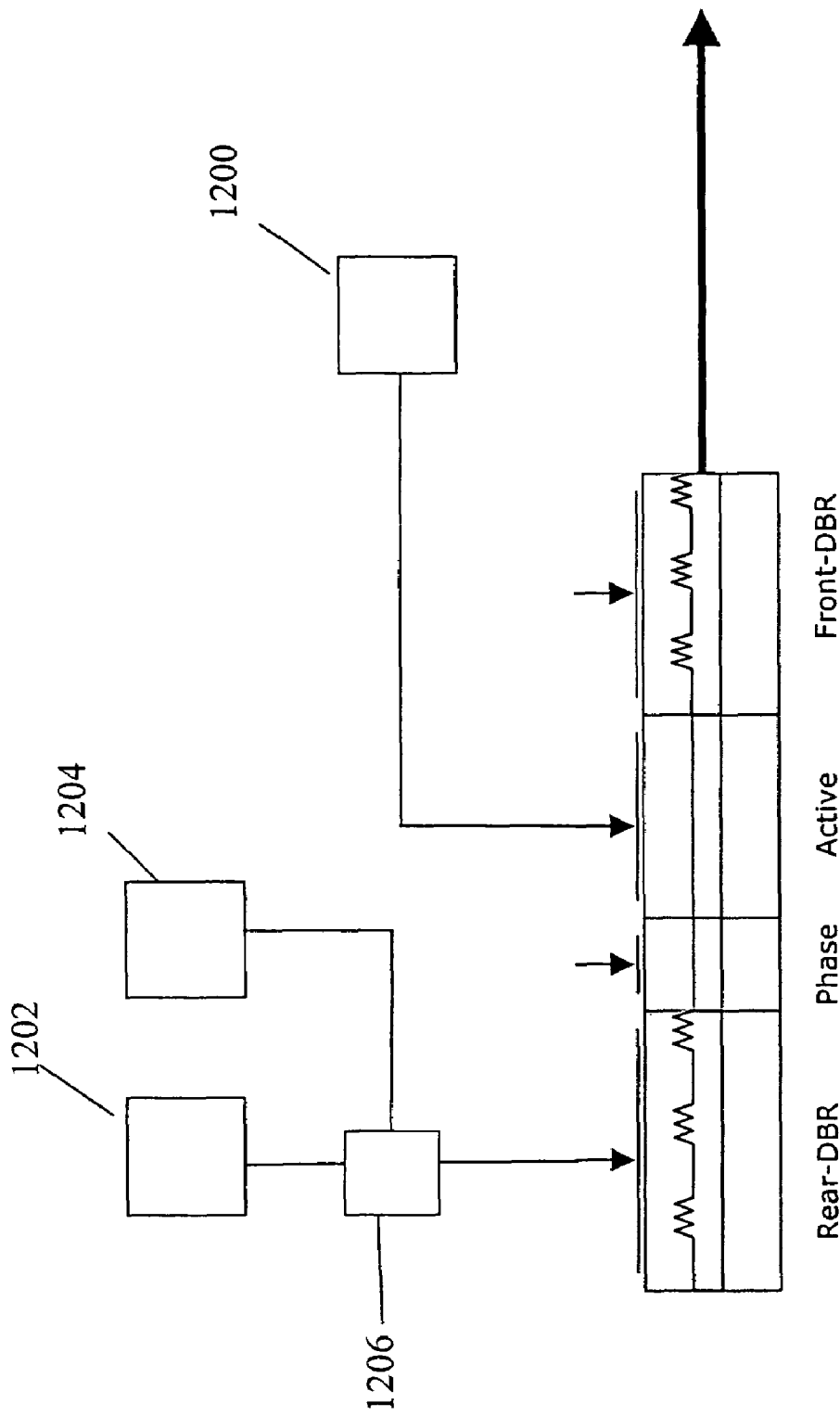

FIG. 22 illustrates a SGDBR and modulating the rear DBR section for frequency modulation.

DETAILED DESCRIPTION OF THE INVENTION

This invention provides a laser transmitter system capable of directly modulating a laser source and partially compensating for the dispersion in the fiber so that the system may be applied to faster bit rate and longer reach applications. This may be accomplished by providing a discriminator that converts frequency modulation (FM) to amplitude modulation (AM) and compensate for the dispersion in the optical fiber so that the laser source may be directly modulated. A variety of discriminators may be used such as a coupled multi-cavity (CMC) filter to enhance the fidelity of FM/AM action as well as introducing enhanced dispersion compensation. By simultaneously optimizing the FM to AM conversion as well as the dispersion compensation properties, the performance of directly modulating the laser source may be optimized.

FIG. 2 illustrates a fiber optic system 100 that includes a current modulator 102 that modulates a laser source 104. The current modulator 102 may directly modulate the laser source 104. In this regard, U.S. Pat. No. 6,331,991 by Daniel Mahgereftech, issued Dec. 18, 2001 is hereby incorporated by reference into this application. The laser source 102 may be a variety of different types of lasers such as a semiconductor laser. The laser may be biased high above the threshold and the level of modulation may produce a predetermined extinction ratio, such as about 2 dB to about 7 dB. The signal from the laser may then pass through an optical discriminator 106 with a dispersion $D_{discriminator}$ in ps/nm and the signal from the laser may be passed through one of its transmission edges. The optical discriminator 106 may convert a partially frequency modulated (FM) signal to a substantially amplitude modulated (AM) signal. In this example, the optical discriminator 106 may be a coupled multi-cavity (CMC) filter to enhance the fidelity of the FM to AM conversion as well as introducing enhanced dispersion compensation to achieve longer reach applications. The resulting signal from the optical discriminator 106 is transmitted through a fiber 108 having net dispersion $D_{fiber}$ in ps/nm. The discriminator may have a predetermined dispersion that is opposite sign of the dispersion in the fiber, e.g., sign $(D_{discriminator})=-\text{sign }(D_{fiber})$ so that the dispersion effect on the fiber may be minimized. This way, the optical signal may travel further without the signal being distorted due to the dispersion in the fiber. The receiver 110 then detects the signal sent through the fiber 108. When the fiber optic system 100 operates in this way, the frequency discriminator 106 increases the modulation depth of the incoming laser output in the FM to AM conversion, reduces chirp by rejecting part of the spectrum, as well as partially compensating for the dispersion in the fiber.

The discriminator 106 may modify the phase of the incoming electric field as well as its amplitude. Group velocity dispersion may be defined as:

$$D = -\frac{2\pi c}{\lambda^2}\frac{d^2\phi}{d\omega^2}, \quad (1)$$

where $D_{discriminator}$ is in units of ps/nm that may be positive or negative depending on the filter shape and frequency as illustrated in FIGS. 3A through 3D. In equation (1): $\phi$ is the phase; $\omega$ is frequency; c is the speed of light; and $\lambda$ is wavelength. For D>0, shorter wavelength components of the wave travel faster than the longer components, and for D<0, the opposite is true. The discriminator 106 may be formed by using the transmission edge of a band pass filter. FIG. 3A illustrates two transmission edges having a positive slope 112 on the low frequency side, and a negative slope 114 on the high frequency side. FIG. 3B illustrates that the sign of the dispersion D 116 may be a function of the relative frequency with distinct features having zeros near the filters transmission edges 118 and 120, respectively on the positive slope side 112 and the negative slope side 114. The dispersion D 116 is also substantially positive in the pass band on the low frequency side 122 and substantially negative on the pass band on the high frequency side 124.

FIG. 4 illustrates the output power 126 and the frequency excursion 128 of the laser from the laser source 104 but before the discriminator 106. After the laser has been passed through the discriminator 106, the output extinction ratio of the signal 130 is greater than 10 dB for either a positive slope portion 112 or a negative slope portion 114 of the discriminator 106. However, the polarity of the output depends on the sign of the slope of the discriminator used. For a positive slope portion 112, the polarity is the same as the output from the laser source 104, whereas the polarity is opposite for a negative slope portion 114. As such, the negative slope portion 114 of the discriminator 106 may be utilized to at least partially compensate for the dispersion in a fiber having net positive dispersion. As a result of using the negative slope portion 114 of the discriminator 106 as a filter, at least some portion of the positive dispersion effect in the fiber may be neutralized so that the signal through the fiber may travel longer distance without becoming distorted. For example, FIGS. 3A and 3B illustrate a spectral position of an optical signal 134 relative to the discriminator in this configuration. The transmissive portion 136 of the optical signal 134 experiences a negative dispersion 124, hence lowering the so-called fiber dispersion penalty and bit error rate ratio at the receiver. That is, along the optical spectral width over the transmissive portion 136, the dispersion in the discriminator has an opposite sign compared to the dispersion in the fiber. FIGS. 3C and 3D illustrate a discriminator response and the spectral position of the modulated laser signal relative to the filter where a non-inverted output results from the positive slope portion 112 from the discriminator 106. The transmissive portion 138 of the signal 140 experiences a positive dispersion 123, thereby at least partially compensating for fiber having a negative dispersion.

FIG. 5 illustrates a discriminator 106 that may be used in a reflection mode rather than in a transmissive mode as discussed in FIGS. 2 and 3. FIGS. 6A and 6B illustrate an optical signal 141 on a negative slope 142 in a reflective mode of the discriminator. In this configuration, the output 132 from FIG. 4 may be inverted relative to the input before the discriminator 106. And as illustrated in FIG. 6B, the spectral position of the input signal relative to the discriminator in a reflective mode may experience a greater negative dispersion than in the transmission mode. Accordingly, the reflection mode may provide for larger dispersion compensation than in the transmission mode.

FIGS. 6C and 6D illustrate an optical signal 143 on the positive slope 144 of the reflection mode of the discriminator. Here, the output 130 (FIG. 4) after the discriminator is not inverted relative to the input. The spectral position of the signal relative to the discriminator is such that the reflected portion may experience a greater positive dispersion than in the transmission mode. In the reflective mode, the discriminator may at least partially compensate for the dispersion in the transmission fiber having net negative dispersion.

There are a variety of filters that may be used as a discriminator. For example, the discriminator 106 may be a thin film discriminator that can operate with a FM modulated source at high bit rates with minimal sensitivity to temperature changes. FIG. 7A illustrates a coupled multi-cavity (CMC) filter 145 that may be used as the discriminator 106 in the optical system 100. FIG. 7B shows the structure of a single cavity filter, which forms a Fabry-Perot. The CMC may be formed by depositing a plurality of thin layers of two materials, such as $Ta_2O_5$ and $SiO_2$, having refractive indices, $n_H$, and $n_L$, where $n_H > n_L$. When light impinges on such a structure, it partially reflects from the interfaces. The interference between these partial reflections produces the desired frequency dependent transmission. The CMC may be made of a plurality of cavities 147 formed by a spacer layer between two multilayer mirrors. Each mirror may be formed by a quarter wave stack (QWS); a stack of alternating layers of high and low index materials, where the optical thickness 149 of the layers may be equal to or about ¼ of the design wavelength in that material. The cavities 147 may be either high index or low index material and may be equal to an interger multiple of ½ wavelength thick.

A single cavity within the CMC may have the same filter response as a Fabry-Perot filter 151 as illustrated in FIG. 7B with a large free spectral range on the order of about 100 nm. With multiple cavities in the CMC, the transmission edges become steeper, while the bandwidth increases to form a flat-top shape with sharp slopes as illustrated in FIGS. 3A-3D. As a result, the CMC has sharper skirts and wider bandwidth for high bit rate applications in comparison to a Fabry-Perot device as illustrated in FIG. 1. The number of cavities in the CMC may be adjusted depending on the application to obtain the desired combination of sharp slope and high dispersion compensation for the signal pass band. The thickness of the layers, and the material of choice for the cavities may be also modified to optimize the design. The temperature sensitivity of the CMC may be adjusted by the choice of the cavity material and substrate. Choosing a material with a low thermal expansion coefficient (TEC) for the cavity produces a CMC with reduced temperature sensitivity, while choosing a material with high TEC makes the CMC more sensitive to temperature.

FIG. 8 illustrates a optical system 100 where the discriminator 106 may be a multi-cavity etalon (MCE) discriminator that has a dispersion $D_{discriminator}$ that is opposite sign to the dispersion of the transmission fiber 108 at a multiplicity of equally spaced wavelengths. The MCE discriminator may be applicable in the wavelength channels used in telecommunications where a grid is assigned with wavelength separated by 100 GHz. Other wavelength spacings include $\Delta v$=25 GHz, 50 GHz, and 200 GHz. To decrease the free spectral range of the CMC for this application, the spacer layers between the mirrors may be increased to $L=c/2n\Delta v$, which corresponds to a length $L=1-4$ mm for $n=1.5$. Rather than using a thin film deposition, a stack Fabry-Perot etalons each having thickness on the order of 1-4 mm may be used to provide the small free-spectral range of about 100 GHz. Increasing the number of the etalons in the stack may increase the steepness of the transmission and the bandwidth may increase slightly, making the MCE discriminator applicable to high bit rate applications. As illustrated in FIG. 9, the transmission 148 and dispersion 150 may be periodic. Like the CMC discriminator, the MCE discriminator may operate in the transmission edge or reflection edge as discussed in FIGS. 3A to 3D.

FIG. 10 illustrates a wavelength-locking system 200 where a discriminator may be used to simultaneously lock the wavelength of the laser diode. The laser 202 and the discriminator 204 may be mounted on separate thermo-electric coolers (TECs) 206 and 208, respectively. A photodiode 210 may monitor the optical power at the back facet of the laser 202, and a photodiode 212 may monitor the optical power reflected from the discriminator 204. The wavelength-locking system 200 may also include a wavelength locking circuit 214 having a comparator 216 communicatively coupled to a divider 218 that compares the ratio of the signals from the two photodiodes 210 and 212. The divider 218 may compare the ratio of the dispersion in the fiber $PD_{filter}$ 212 to the dispersion in the laser $PD_{laser}$ 210, where the ratio $r = P_{reflected}/P_{Laser}$ which may be a substantially fixed set value. The error signal produced in this way may then control the laser TEC 206 to adjust the laser temperature and therefore shift the laser wavelength in order to keep r substantially constant. To avoid wavelength drift, the temperature of the discriminator 204 may be held substantially constant by the thermoelectric cooler 208, and the corresponding temperature sensors 220.

FIG. 11 illustrates another wave locking system 230 capable of locking the laser wavelength to the edge of the discriminator by operating the photodiode 212 in the transmissive side of the discriminator 204. As such, the circuit 214 may now measure the portion of the optical power or signal that has been transmitted through the discriminator 204 using the detector 212 on the transmission side of the discriminator 204. The divider 218 within the circuit 214 may compare the ratio of the dispersion in the fiber $PD_{transmissive}$ 212 to the dispersion in the laser $PD_{laser}$ 210, to hold the ratio $r = P_{transmissve}/P_{Laser}$ in a substantially fixed set value.

A variety of optical discriminators with a desired sign of dispersion may be formed using a variety of filters including a fiber Bragg grating filter in transmission or in reflection, a multicavity thin film filter in transmission or in reflection, an arrayed waveguide grating. A Bragg grating is formed by making a periodic spatial modulation of the refractive index in a material, such as a fiber or a planar waveguide. The period of the index may be on the order of $\lambda/2n$, where $\lambda$ is the wavelength of light, and n is the average refractive index of the waveguide. FIG. 12 illustrates cascading a plurality of non-interfering CMCs, such as a first CMC 300 and a second CMC 302, to obtain a desirable filter characteristic. The transmission function $H(\Omega)$ of such cascading filters may be express as a function of frequency $\Omega$, which is the product of the transmission function of the individual filters. And the dispersion of the cascading filters is the sum of the dispersions of the individual filters. Accordingly, the sum of the dispersions of the cascading filters may be predetermined or designed to have the opposite sign of the dispersion of the transmission fiber at the operational wavelength.

Cascading filters to obtain a desirable dispersion that is opposite of the dispersion in the fiber may offer flexibility in designing a discriminator with the desirable characteristics. For example, filters with sharp slopes may require expanded optical beams so that the constituent spatial wavelets of the incident beam are substantially incident at the same angle.

Typical laser beams with a finite spatial profile, such as a guassian, include plane waves having a distribution of wavevectors that have an angular distribution. This angular distribution may be determined by the spatial Fourier transform of the beam. With the characteristics of the filter changing slightly as a function of incident angle, the transmission of a beam of finite spatial extent through a filter with sharp spectral features may produce a response that may broaden relative to the ideal case. This unwanted broadening may be voided by producing the desired filter function with sharp slope by a cascading filters with smaller slopes.

FIG. 13 illustrates a plurality of cascading transmission filters, such as first and second filters 304 and 306, for producing optical discrimination, and a separate reflective type device, such as a Gire-Tournois interferometer 106, for dispersion compensation. The cascading transmission filters may be optimized for their amplitude response, and the reflective filter may be optimized for dispersion compensation. The optical discriminator may be also a multicavity thin film filter where change in temperature does not substantially change the optical spectrum. With the multicavity thin film filter, temperature stabilization of the filter may not be necessary.

Optical transmitters may need to operate within a range of temperatures, such as 0- 80° C., to have minimal degradation in their output of optical waveforms. The wavelength of a semiconductor distributed feed-back (DFB) laser may change rapidly with increasing temperature, typically at a rate of $d\lambda/dT$ in about 0.1 nm/C. As discussed above FIGS. 3A-3D and 6A and 6D, the point of operation needs to remain substantially fixed as a function of temperature. The point of operation is the spectral position of the frequency modulated signal 136, 138, 141, or 144 incident on the discriminator relative to the peak transmission of the discriminator. For example, the optimum point may be the spectral position of the signal which produces a 3 dB loss after passing through the discriminator. The locking circuit illustrated in FIGS. 10 and 11 substantially accomplish this objective with the addition of circuitry and TEC. In low cost applications, the thermoelectric cooler associated with the DFB laser may be eliminated. In such a case, the multicavity thin film filter or other discriminator may be predetermined so that it has the same coefficient of thermal drift $d\lambda/dT$ as that of the DFB laser. This may eliminate the need for TECs and corresponding control circuits, and keep the laser wavelength substantially fixed relative to the transmission edge of the filter.

A variety of laser sources may be used with this invention. FIG. 14 illustrates a FM modulated source 400 capable of producing an FM modulated signal. The FM modulated source 400 may be a variety of different types of lasers, such as: (1) single wavelength semiconductor lasers; (2) external modulation; and (3) tunable semiconductor lasers. There are several types of single wavelength lasers such as DFB edge emitters and vertical cavity surface emitting lasers (VCSELs). The VCSELs and DFB may be directly modulated to produce a signal that is frequency modulated. The VCSELs may be made of two distributed Bragg reflector (DBR) mirrors, each formed by a stack of alternating layers of high and low refractive index material to produce high reflectivity mirrors vertical to the growth surface. The gain medium may be sandwiched between two such DBR mirrors. FIG. 15 illustrates a combiner 504 capable of combining the modulation signal from a driver 500 and dc bias source 502 to provide a summed $I_b+I_{mod}$ signal 506 that is used to directly modulate a VCSEL 508. The sum signal or current 506 is supplied to bias the laser above the threshold and modulate its gain, and therefore modulating the frequency of the output to produce a partially frequency modulated signal.

FIG. 16 illustrates that the optical signal from a continuous wave (CW) source 600 may be externally phase modulated before being filtered by the optical discriminator 602. The output from the CW laser 600 may enter a phase modulator 604 followed by the optical discriminator 602. An electrical signal from an external driver 606 may drive the modulator 604 that may impart a phase shift on the CW signal after the laser. The optical discriminator 602 may then convert the FM modulation to AM modulation and simultaneously provide a partial dispersion compensation for propagation though the fiber 608 before being detected by the receiver 610. The optical discriminator 602 may be chosen to have a dispersion that is the opposite sign of the transmission fiber 608. A variety of different types of the external phase modulator 606 may be used, such as a semiconductor modulator, a $LiNbO_3$ phase modulator, or a semiconductor optical amplifier (SOA). A SOA is normally used to provide gain. It is biased at a high current and has substantially more gain than loss. A care may need to taken to remove feed-back paths to the SOA, or it may become a laser.

FIG. 17 illustrates that the SOA 700 may be placed after a CW laser 702 to provide a gain as well as frequency modulation. A combiner 704 may combine a modulating current signal $I_{mod}$ from current modulator 706 and a bias current $I_b$ 708 to provide a summed $I_b+I_{mod}$ signal 710. This signal modulates the gain as well as the refractive index of the SOA 702. The index change may produce a corresponding phase change to the incident light and may be used to encode the signal with data. The optical discriminator may convert the phase modulation to amplitude modulation as described above. The discriminator may be adapted to have dispersion that is opposite of the dispersion of the fiber at the operational wavelength.

FIG. 18 illustrates using tunable laser sources for producing the FM modulated signal as well. The laser source producing the FM modulated signal may be a distributed Bragg reflector (DBR) laser, where the Bragg grating may be separate from the gain section. By way of background, a DFB laser may be formed from a Bragg grating over the entire laser structure. A DBR laser generally has three sections: (1) a gain section; (2) a distributed Bragg reflector section; and (3) a phase section. These separate sections may be electrically isolated and biased by different currents. As illustrated in FIG. 18, the current to the gain section may be modulated to produce an amplitude and frequency modulated signal. A modulation signal $I_{mod}$ produced by the driver 800 may be combined with the dc bias current $I_b$ from a second source 802 using a bias-T or other combiner 804. The sum current $I_b+I_{mod}$ 806 may be used to modulate the laser high above threshold as described above for a DFB. The current to the DBR section may be used to tune the center wavelength, and the phase section may be used to prevent the device from mode hopping, as is discussed in the case of CW.

FIG. 19 illustrates that the DBR laser may be frequency modulated by modulating the current of the DBR section that controls the wavelength in the output of the laser. A modulation signal from a driver 900 may be combined with a dc current from a source 902 using a combiner 904 to drive the DBR section. The dc component may controls the center wavelength of the operation, and the modulating current may produce the desired frequency modulation. The output from laser may then pass through an optical discriminator to produce low-chip pulses with high contrast ratio.

FIG. 20 illustrates a laser source that may be a sampled grating distributed Bragg reflector laser (SGDBR) 1000. A SGDBR laser 1000 may have four sections: (1) A sampled grating in the back; (2) a gain section; (3) a phase section, and (4) a sampled grating in the front. The function of the gain section and phase section are similar to the DBR laser described above. However, in a SGDBR, the lasing wavelength may be determined by both the front and back distributed reflectors. A sampled grating is a grating with a certain periodicity that may have its index change spatially modulated in order to provide a periodic reflection coefficient.

The FM modulated signal may be produced in a variety of ways. For example, the FM modulated signal may be produced by directly modulating the gain section of the laser as in FIG. 20. In such a case, the modulation signal $I_{mod}$ from a driver 1002 may be combined with a dc bias $I_b$ from a dc current source 1004 using a combiner 1006, and the resulting sum current $I_b + I_{mod}$ may be used to modulate the gain section. This produces an FM modulated signal that may be inputted to the optical discriminator as described above.

FIG. 21 illustrates that the gain section may be biased using a dc current source 1200. The front sampled grating section may be supplied with a modulated current to produce FM modulated signal. Signal from a modulator 1202 may be combined with a dc current from a dc source 1204 using a combiner 1206 and the sum current supplied to the sampled grating section. The dc bias current may determine the center wavelength of the output signal together with the current supplied to the back reflector. The modulation signal produces the FM signal needed to be supply the optical discriminator. And as illustrated in FIG. 22, the FM modulating signal may also be supplied to the back mirror as well.

What is claimed is:

1. A fiber optic communication system, comprising:
   an optical signal source adapted to produce a partially frequency modulated signal;
   a first optical discriminator adapted to convert the partially frequency modulated signal into a substantially amplitude modulated signal; and
   a second optical discriminator having an associated dispersion $D_d$ adapted to receive the substantially amplitude modulated signal and compensate for at least a portion of a dispersion $D_f$ in a transmission medium, where $D_d$ is the opposite sign of $D_f$.

2. The system according to claim 1, where the first optical discriminator is a first coupled multi-cavity (CMC) filter having a first transmission function and a first dispersion, and the second optical discriminator is a second CMC filter having a second transmission function, where the first and second CMC filters have a combined transmission function that is substantially a product of the first and second transmission functions, and a combined dispersion that is substantially a sum of first dispersion and the associated dispersion $D_d$ of the second optical discriminator.

3. The system according to claim 1, where the optical signal source is a directly modulated laser.

4. The system according to claim 1, where the second optical discriminator is adapted to reflect a portion of the substantially amplitude modulated signal to produce a reflected signal that is used to wavelength lock the partially frequency modulated signal.

5. The system according to claim 1, where the second optical discriminator is a Gire-Tournois interferometer.

6. The system according to claim 1, where the first optical discriminator is adapted to reflect a portion of the partially frequency modulated signal to produce a reflected signal that is used to wavelength lock the partially frequency modulated signal.

7. The system according to claim 1, where the first optical discriminator is a multi-cavity etalon filter where the dispersion $D_d$ of the second optical discriminator occurs at a multiplicity of equally spaced wavelengths.

8. The system according to claim 1, where the first optical discriminator is a sampled Bragg grating filter.

9. The system according to claim 8, where the sampled Bragg grating filter is formed in a fiber.

10. The system according to claim 8, where the sampled Bragg grating filter is formed in a planar waveguide.

11. The system according to claim 1, further including a wavelength locking circuit adapted to wavelength lock the partially frequency modulated signal by comparing the partially frequency modulated signal to a reflected signal and then adjusting the optical signal source to keep a ratio of the partially frequency modulated signal to the reflected signal substantially constant.

* * * * *

UNITED STATES PATENT AND TRADEMARK OFFICE
CERTIFICATE OF CORRECTION

PATENT NO. : 7,477,851 B2  
APPLICATION NO. : 11/272100  
DATED : January 13, 2009  
INVENTOR(S) : Mahgerefteh et al.

Page 1 of 2

It is certified that error appears in the above-identified patent and that said Letters Patent is hereby corrected as shown below:

Column 2  
Line 58, insert --a-- after "As such,"

Column 3  
Line 16, insert --a-- after "require"  
Line 65, change "illustrate" to --illustrates--  
Line 66, insert --a-- after "about"

Column 4  
Line 3, change "illustrate" to --illustrates--  
Line 7, remove [a]  
Line 12, remove [a]  
Line 23, insert --the-- after "illustrates"  
Line 27, insert --the-- after "illustrates"  
Line 32, change "filters" to --filter--  
Line 34, insert --a-- after "with"  
Line 35, insert --the-- after "of"  
Line 43, insert --the-- after "to"

Column 5  
Line 23, change "compensate" to --compensates--  
Lines 34-35, change "Mahgereftech" to --Mahgerefteh--

Column 7  
Line 6, change "output 130" to --output 132--  
Line 31, change "¼of" to --¼ of--  
Line 33, change "interger" to --integer--  
Line 34, change "½wavelength" to --½ wavelength--

Signed and Sealed this  
Twenty-second Day of February, 2011

David J. Kappos  
*Director of the United States Patent and Trademark Office*

Line 41, change "skirts" to --slopes--
Line 47, change "layers," to --layers--
Line 55, change "a" to --an--
Line 61, change "wavelength" to --wavelengths--

Column 8
Line 37, change "detector 212" to --photodiode 212--
Line 55, change "express" to --expressed--

Column 9
Line 2, change "guassian" to --gaussian--
Line 12, change "a cascading filters" to --cascading filters--
Line 34, change "signal" to --signals--
Line 60, change "material" to --materials--

Column 10
Line 16, change "phase modulator 606" to --phase driver 606--
Line 17, change "LiNbO$_3$" to --LiNbO3--
Lines 20-21, change "A care" to --Care--
Line 23, change "SOA 700" to --SOA 702--
Line 24, change "CW laser 702" to --CW laser 700--
Line 61, change "controls" to --control--
Line 63, after "from" insert --the--

Column 11
Line 21, after "produce" insert --an--
Line 28, remove [be]